US012629924B2

(12) United States Patent　(10) Patent No.:　US 12,629,924 B2

Karandinos et al.　(45) Date of Patent:　May 19, 2026

(54) FILM

(71) Applicant: MEGA PLAST INDUSTRIAL—EXPORTING S.A., Heraklion (GR)

(72) Inventors: Anthony Karandinos, Attica (GR); Georgia Tsoukleri, Attica (GR)

(73) Assignee: Mega Plast Industrial—Exporting S.A., Heraklion (GR)

( * ) Notice: Subject to any disclaimer, the term of this patent is extended or adjusted under 35 U.S.C. 154(b) by 0 days.

(21) Appl. No.: 18/570,931

(22) PCT Filed: Jun. 16, 2022

(86) PCT No.: PCT/EP2022/066531

§ 371 (c)(1),
(2) Date: Dec. 15, 2023

(87) PCT Pub. No.: WO2022/263617

PCT Pub. Date: Dec. 22, 2022

(65) Prior Publication Data

US 2025/0128501 A1　Apr. 24, 2025

(30) Foreign Application Priority Data

Jun. 18, 2021　(GB) ..................................... 2108809

(51) Int. Cl.
B32B 27/08　(2006.01)
B32B 3/26　(2006.01)
(Continued)

(52) U.S. Cl.
CPC .............. B32B 27/08 (2013.01); B32B 3/266 (2013.01); B32B 38/0012 (2013.01);
(Continued)

(58) Field of Classification Search
CPC ..... B32B 27/08; B32B 3/266; B32B 38/0012; B32B 38/004; B32B 38/04
(Continued)

(56) References Cited

U.S. PATENT DOCUMENTS 8,053,056 B2　11/2011　Heikaus et al.
2001/0008676 A1　7/2001　Pelkie et al.
(Continued)

FOREIGN PATENT DOCUMENTS

DE　29519905 U1　4/1997
EP　0371080 B1　6/1995
(Continued)

OTHER PUBLICATIONS

International Preliminary Report on Patentability mailed on Dec. 14, 2023, in PCT/EP2022/066531.
(Continued)

*Primary Examiner* — Tahseen Khan

(74) *Attorney, Agent, or Firm* — Meunier Carlin & Curfman LLC

(57)　ABSTRACT

The present invention provides a thermoplastic stretch film comprising a base film arranged in a plurality of columns, and a multiplicity of holes in the base film arranged in a plurality of columns, wherein the plurality of columns of base film and plurality of columns of holes extend along a longitudinal direction of the base film; wherein each column of holes comprises a plurality of holes, wherein each hole is separated from its adjacent hole within each individual column by a spacer, wherein each spacer comprises a strip of base film which has been selectively prestretched in a transverse direction of the film to a value up to its elongation at break; wherein each column of holes is separated from each adjacent column of holes by one or more columns of
(Continued)

Substantially misaligned　Non-perforated reinforced column (6)

MD

Stretched spacers (5)

TD base film. Processes for making the film and uses of the film in packaging applications are also provided.

38 Claims, 19 Drawing Sheets

(51) Int. Cl.
  *B32B 38/00*  (2006.01)
  *B32B 38/04*  (2006.01)

(52) U.S. Cl.
  CPC ............ *B32B 38/004* (2013.01); *B32B 38/04* (2013.01); *B32B 2038/0028* (2013.01); *B32B 2038/047* (2013.01); *B32B 2307/514* (2013.01); *B32B 2307/7376* (2023.05); *B32B 2398/20* (2013.01)

(58) Field of Classification Search
  USPC ......................................................... 428/138
  See application file for complete search history.

(56) References Cited

U.S. PATENT DOCUMENTS

| | | | |
|---|---|---|---|
| 2005/0118391 A1 | 6/2005 | Kavvadias et al. | |
| 2012/0288669 A1* | 11/2012 | Gatos ..................... | B29C 48/10 428/221 |
| 2013/0052410 A1 | 2/2013 | Gatos et al. | |
| 2017/0174852 A1* | 6/2017 | Hanschen ................ | B32B 7/05 |
| 2019/0070838 A1* | 3/2019 | Gatos ..................... | B32B 3/266 |

FOREIGN PATENT DOCUMENTS

| | | | | |
|---|---|---|---|---|
| EP | 0820856 | A1 | 1/1998 | |
| EP | 1255681 | B1 | 6/2004 | |
| EP | 0919655 | B2 | 8/2011 | |
| WO | 20010191997 | A1 | 12/2001 | |
| WO | 2004/022634 | A1 | 3/2004 | |
| WO | 2004080695 | A1 | 9/2004 | |
| WO | 2006018028 | A1 | 2/2006 | |
| WO | 2011/026954 | A2 | 3/2011 | |
| WO | WO-2011026955 | A1 * | 3/2011 | ............ B32B 27/32 |

OTHER PUBLICATIONS

International Search Report and Written Opinion received in PCT/EP2022/066531, mailed Oct. 17, 2022.

Third Party Observation received in PCT/EP2022/066531, mailed Oct. 17, 2023.

Air-0-Film Packaging Material Technical Specifications, https://web.archive.org/web/20031219231246/http://www.megaplast.gr:80/Specifications.htm, retrieved Dec. 19, 2003.

Air-0-Tite 200, https://web.archive.org/web/20060819081905/http:/austwarehouse.com.au/_download/PMT/airOTite%20brochure.PDF, retrieved Aug. 19, 2006.

Air-0-Film Maxx, Mega Plast SA, https://web.archive.org/web/20121222040820/http://www.airofilm.com/uploads/datasheet-for-airo-o-film-maxx.pdf, retrieved Dec. 22, 2023.

Clearflex, TDS, https://www.granulat.com.pl/media/pdf/clearflex%20cl %20d0.pdf, published Nov. 2014.

\* cited by examiner

Substantially
misaligned

Non-perforated reinforced
column    (6)

MD

TD

Spacer (4)

Substantially
misaligned

Non-perforated reinforced
column   (6)

MD

TD

Stretched spacers
(5)

7

8

9

7

8

Non perforated column of base
film sitting on a fixed plastic element

Base film
(1)

Spacer
(5)

Fixed plastic wheel
(10)

Stretching disc (9)

Flexibility bead (5a)

(a)

Partial TD stretching of spacers, fully extended width ~56cm

10cm    20cm    30cm    40cm    50cm    60cm    66cm (b)

Without partially TD stretching of spacers, width ~45.5cm

10cm    20cm    30cm    40cm    50cm    55.5cm

[23]

[24]

[21]

[22]

Reinforcing element
placed on the non-
perforated column

Non-perforated and non-
reinforced column

FILM

FIELD OF THE INVENTION

This invention relates to a perforated stretchable film. In particular, the present invention is directed to a perforated stretchable film with controllable physical and mechanical properties such as low necking, high elongation potential and high width retention during application. Articles according to the present invention may be silage, stretch film, prestretched stretch film, hood film or mulch film, and can be produced by known methods of extrusion or co-extrusion such as cast, blown and the like. Films according to the present invention are characterised by their significantly lower weights and improved usability relative to existing films known in the art with similar physical and mechanical properties.

BACKGROUND OF THE INVENTION

It is known in the art that stretch film is a valuable tool for the flexible packaging of goods, and unitization of loads on a pallet.

Several stretch films for packaging applications have been previously described. EP0371080B1 discloses a stretch wrapping film, comprising a primary stretch film reinforced with a secondary stretch film which is laminated onto the primary film. Films of this type, when used to wrap palletised goods, are unable to provide adequate aeration to the goods within.

It has been possible to achieve better aeration of palletised goods and increased film strength when pulled in the main direction (MD: i.e. the longitudinal or machine direction) with stretch films comprising a thin base film, ventilation holes and longitudinal reinforcing elements.

US2005/0118391A1 discloses a perforated reinforced stretch film which has strips that extend in the MD and are attached to the base film between the rows of holes, where the strips prevent the propagation of tears. Parts of the strips extend sideways in the transverse direction (TD). The resulting films are heavy, difficult to manufacture and susceptible to necking, with more material required to achieve a satisfactory coverage and grip on the goods.

EP1768837B1 discloses a stretch film comprising a base film made of a stretchable plastic film material and reinforcing strips, with a multiplicity of holes in the base film arranged in several columns along a main direction. A lip is formed around each hole by an accumulation of plastic material from the base film, but the reinforcement strips do not overlap the lips. The film has compromised width, requiring more film to be used to achieve an appropriately secure package, and has low aeration, which can be undesirable in packaged goods. It also exhibits a low holding force across the TD, requiring yet further material to achieve a secure hold.

EP820856A1 discloses a thin perforated prestretched film where the perforations are made by thermal radiation without contacting the film and occupy 30-70% of the surface of the film. Material is accumulated and thereby forms a lip around each hole. The film is susceptible to necking and has low remaining stretchability in the MD.

Nets are used for several packaging purposes; however, their stretchability is poor, and their manufacture is resource intensive. Perforated prestretched stretch films are used in the packaging of pallets, bales of hay, fruit, etc., in order to provide for sufficient stretchability and ventilation.

US2003/185926A1 discloses a plastic net consisting of a prestretched plastic stretch film in order to replace nets. The prestretched plastic net comprises bridges and filaments. The filaments extend in a main direction and are transversely folded in order to increase their tensile strength. The plastic net is susceptible to necking, has low stretchability in the MD and has compromised width, thus requiring more material to be used in order to achieve a secure fit on a pallet.

EP0919655B2 discloses a modified schuss knitted netting and a method and an apparatus for making said netting. The net exhibits low elasticity and produces large quantities of waste netting in use, which can become tangled in machinery. In addition, the net requires knotting by hand in two places when wrapping goods, which presents difficulties and dangers to the user.

DE10310814A1 discloses a plastic stretch film and a net made therefrom, useful for the packaging of goods. The plastic stretch film comprises a plurality of threads extending in the main direction, onto which additional film strips are placed. The web surfaces between the threads can be made extremely thin and the threads, required to give the film tensile strength, are reinforced by the additional film strips. However, the films in DE10310814A1 are heavy as the threads are folded transversely, together with the film strips. The folding means that the base film is not of substantially uniform thickness between the web surfaces. The folded regions in DE10310814A1 lead to instability and unpredictable behaviour when the film is stretched. Furthermore, the presence of perforations is optional in this reference.

It is well known that if a stretchable film is subjected to a stretching process in the TD, then the stretchability of the prestretched film in the MD is reduced, and the resulting article loses efficacy and therefore its value as a stretchable packaging material. On the other hand, a highly stretchable film may exhibit satisfactory stretchability, but in so doing it can be affected by high necking on the pallet, which again compromises its value as a stretchable packaging material.

The stretching of perforated films and plastic nets is often complicated by necking, the process by which the stretching of a material in the longitudinal direction elicits a reduction in the transverse width. With increased pulling force, this can lead to the width decreasing to a critical neck-in point, which cannot support the pulling force anymore and as a result structural failure becomes more likely (extensive necking makes the film ineffective, sometimes even unusable for wrapping a pallet, since the covered area becomes minimal and the material required for wrapping becomes prohibitively high). The presence of necking in a film reduces the film's suitability for use and reduces its value. The same applies to a necking in a plastic net. The process of necking in a material can induce a neck-in, which is the physical manifestation of the process of necking.

The objective of the present invention is to overcome the problems mentioned above, providing a solution in the form of optimised stretch films.

SUMMARY OF THE INVENTION

In accordance with a first aspect of the invention there is provided a thermoplastic stretch film comprising:
  a base film arranged in a plurality of columns, and
  a multiplicity of holes in the base film arranged in a plurality of columns,
  wherein the plurality of columns of base film and plurality of columns of holes extend along a longitudinal direction of the base film;
  wherein each column of holes comprises a plurality of holes, wherein each hole is separated from its adjacent hole within each individual column by a spacer, wherein each spacer comprises a strip of base film which has been selectively prestretched in a transverse direction of the film to a value up to its elongation at break;

wherein each column of holes is separated from each adjacent column of holes by one or more columns of base film.

In a preferred first aspect, there is provided a thermoplastic stretch film comprising:

a base film arranged in a plurality of columns, and a multiplicity of holes in the base film arranged in a plurality of columns, wherein the plurality of columns of base film and plurality of columns of holes extend along a longitudinal direction of the base film;

wherein each column of holes comprises a plurality of holes, wherein each hole is separated from its adjacent hole within each individual column by a spacer, wherein each spacer comprises a strip of film which has been selectively prestretched in a transverse direction of the film to a value up to its elongation at break;

wherein each column of holes is separated from each adjacent column of holes by one or more columns of base film;

wherein the base film is of substantially uniform thickness.

In accordance with a second aspect of the invention there is provided a process for producing a thermoplastic stretch film according to the first aspect of the invention, comprising:

providing an initial extruded plastic stretch film;

perforating the initial plastic stretch film to form an intermediate plastic film comprising columns of holes in the longitudinal direction, wherein each hole is separated from an adjacent hole in the longitudinal direction by a spacer;

and selectively prestretching each spacer in the transverse direction of the film.

The step of generating perforations results in a film which will be hereinafter referred to as the "intermediate" film.

In accordance with a third aspect of the invention there is provided a thermoplastic stretch film obtainable from a process for producing a thermoplastic film according to the second aspect of the invention.

In the process of the invention the holes of the intermediate film are formed by perforating the initial extruded plastic stretch film. Accordingly, in the product of this method (i.e. the film of the third aspect of the invention) the holes may be referred to as perforations. The holes in the film of the first aspect of the invention may be also be referred to as perforations.

In accordance with a fourth aspect of the invention there is provided a use of a thermoplastic stretch film according to the first aspect of the invention or the film obtainable according to the third aspect of the invention for packaging.

The optimised thermoplastic stretch film of the present invention is particularly suitable for unitisation of goods, e.g. packages, bales, silage or plants bearing sharp edges. It is also suitable for use in mulching, for example on arable land to suppress weeds and conserve water in crop production and landscaping.

The film of the invention contains holes and is therefore termed "perforated". The present invention provides a film which benefits from the partial prestretching of selected local areas (known as spacers) of a perforated stretch film in the transverse direction. The targeted prestretching results in a perforated stretch film that maintains its properties in the MD, i.e. the prestretching is localised in such a way that only the spacers are extended in the TD. Accordingly, the selective prestretching of the spacers in the invention is also known as selective extension of the spacers. The length of the spacers increases during the prestretching. The resulting reshaped article provides improved wrapping properties during the unitisation of packaged goods on a pallet.

In particular, the partial prestretching focuses on the spacers of base film that separate adjacent holes within each column of holes, and which connect two adjacent non-perforated columns of base film material. Since these spacers are located between holes, and the holes extend along the MD, the spacers participate minimally during stretching along the MD. Accordingly, prestretching the spacers does not impact the elongation of the film as a whole in the MD.

The invention provides a stretch film that is wider than the intermediate (perforated) film, and retains much of its width during MD stretching. Additionally, the film retains the stretchability in the MD with increased TD holding force. The film of the invention also reduces the degree of necking of the film on the pallet. The film of the invention applies a more homogeneous distribution of forces when wrapped around a pallet, which thus increases the stability of the pallet while at the same time reducing the need for wrapping material. The prestretched spacers, are stiffer in the TD of the film in use, and therefore exert a greater holding force when wrapped around objects placed for unitisation upon a pallet. The greater holding force permits the use of less plastic film for the same overall purpose, which has many benefits.

It is a benefit of the invention that air flow (or aeration, %) is increased, which decreases the time needed to balance the environmental conditions within and outside the wrapped goods. In other words, superior aeration allows the goods inside the wrapping to acclimatize with the surrounding conditions more readily, which avoids hermitization. It is a benefit of the invention to provide the maximum pallet coverage with the minimum amount of film while maintaining good stability and secure loading.

Many variables can influence the behaviour of a film during its application, including geometrical features and degree of selective prestretching of the spacers. The said variables can be tailored to enhance the properties of the film and boost film performance during use. In particular, the selective prestretched spacers will reduce necking phenomena, such that the end film will meet a number of different application requirements, which may vary depending on intended use. The necking reduction is achieved without compromising film MD properties. As a result, it is possible to retain a greater width of the stretch film during application.

In addition to selective TD prestretching, it is desirable to increase the tear resistance in the MD in order to meet the different requirements of the end film, which may vary depending on intended use. The propagation of tears along the film is inhibited and delayed by the spacers, which facilitates continuous wrapping processes. Hence, the integrity of the stretch film and its packaging ability are enhanced without interrupting the packaging procedure.

For hand-wrapping, the end user cuts said stretch film by hand after finishing the unitisation of the goods. Similarly, for automated wrapping lines the film is cut at its edge by a suitable knife.

The present invention provides the abovementioned characteristics while minimising overall material usage and cost. The optimised thermoplastic stretch film of the invention is wider than existing perforated films of the art and provides strong holding force on goods. This permits the use of less overall material for the same end result. These aspects have significant additional benefits in terms of environmental and recycling issues.

BRIEF DESCRIPTION OF THE DRAWINGS

Further features and advantages of the reinforced stretch film according to the present invention become apparent from the illustrative description of exemplary embodiments thereof taken in conjunction with the accompanying drawings, wherein.

Figure 1A:
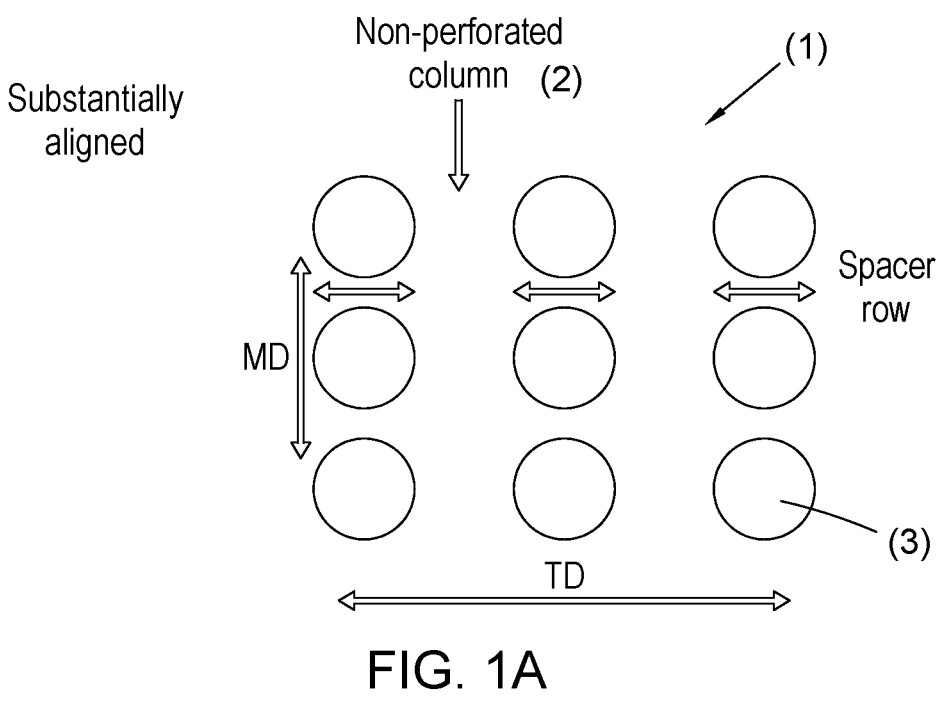
FIG. 1A shows a perforated film without prestretched spacers (thus corresponding to the 'intermediate' film as defined herein).

It is noted that the drawn figures are not drawn to scale and represent only schematic illustrations of systems. They do not represent the actual proportions of objects according to the present invention.

DETAILED DESCRIPTION OF THE INVENTION

All preferred embodiments and features according to the present invention should be considered as disclosed in combination with other preferred embodiments and features of the invention.

In this invention, the main direction (MD) refers to the longitudinal direction of the film; and the transverse direction (TD) refers to the direction of the film perpendicular to this, i.e. across the width of the film. The main direction is also known as the machine direction, since this is the direction in which the film moves through machinery during production: this term is well understood in the art. It may also be defined as the longitudinal direction. The spacers as defined herein are selectively prestretched in the transverse direction of the base film. By "prestretched", what is meant is a selective stretching process which targets the spacers and does not impact the rest of the film. This selective prestretching process takes place during production of the thermoplastic film and before the film is used for instance, to package goods.

In this invention, an 'initial' plastic film denotes a non-perforated plastic stretch film such as might be introduced at the beginning of the process according to the second aspect of the invention. An 'intermediate' film denotes a perforated plastic stretch film whose spacers have not been selectively prestretched, and can be used as a reference film. A film according to the invention is therefore produced from the initial plastic film by perforation to produce an intermediate film and then selective TD prestretching to yield the final result.

It is well known that if a stretchable film is subjected to a stretching process in a transverse direction, then the stretchability of the prestretched film in the MD is reduced and the resulting article loses part of its effectiveness and therefore value as a stretchable material. On the other hand, a highly stretchable film may exhibit satisfactory stretchability but at the same time will exhibit high necking on the pallet. This limits its effectiveness and therefore its value for packaging applications.

It is the object of the present invention to provide a stretch film with increased width without sacrificing machine direction (MD) properties while also providing controllable film properties, such as strength, stretchability, necking reduction and controllable aeration, in order to achieve effective and optimum utilisation in packaging, while minimising material consumption.

In accordance with a first aspect of the invention there is provided a thermoplastic stretch film comprising:

a base film arranged in a plurality of columns, and
   a multiplicity of holes in the base film arranged in a plurality of columns,
   wherein the plurality of columns of base film and plurality of columns of holes extend along a longitudinal direction of the base film;

wherein each column of holes comprises a plurality of holes, wherein each hole is separated from its adjacent hole within each individual column by a spacer, wherein each spacer comprises a strip of base film which has been selectively prestretched in a transverse direction of the film to a value up to its elongation at break;

wherein each column of holes is separated from each adjacent column of holes by one or more columns of base film.

Advantageously, the film of the invention exhibits increased holding force without sacrificing the stretchability in the MD. The wider film also results in increased aeration for packaged goods, better coverage of the pallet and reduced necking, all whilst using a film that has a lower weight per square metre.

In an embodiment, the width of the stretch film of the invention is increased by more than 2%, preferably more than 15%, more preferably more than 25%, most preferably more than 45% relative to an equivalent film (i.e. an intermediate film) not comprising prestretched spacers.

It is understood that the film of the invention possesses spacers of different thickness and/or width to a film comprising spacers which have not been prestretched, i.e. the intermediate film. The spacers may alternatively be referred to as "spacer strips."

Figure 2A:
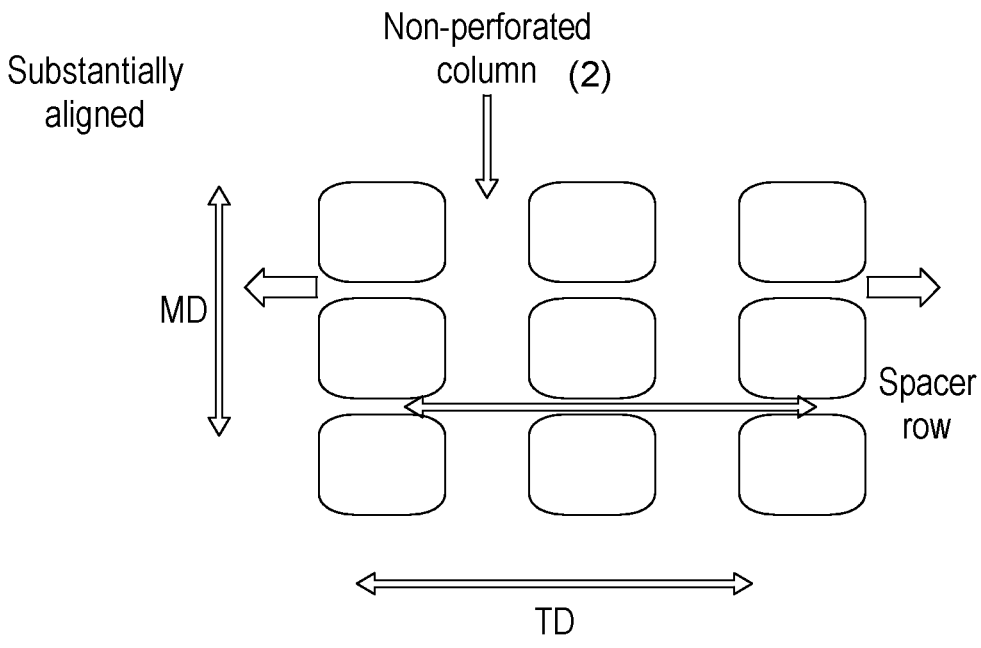
FIG. 2A shows a perforated film according to the invention after prestretching of the spacers.
Figure 2B:
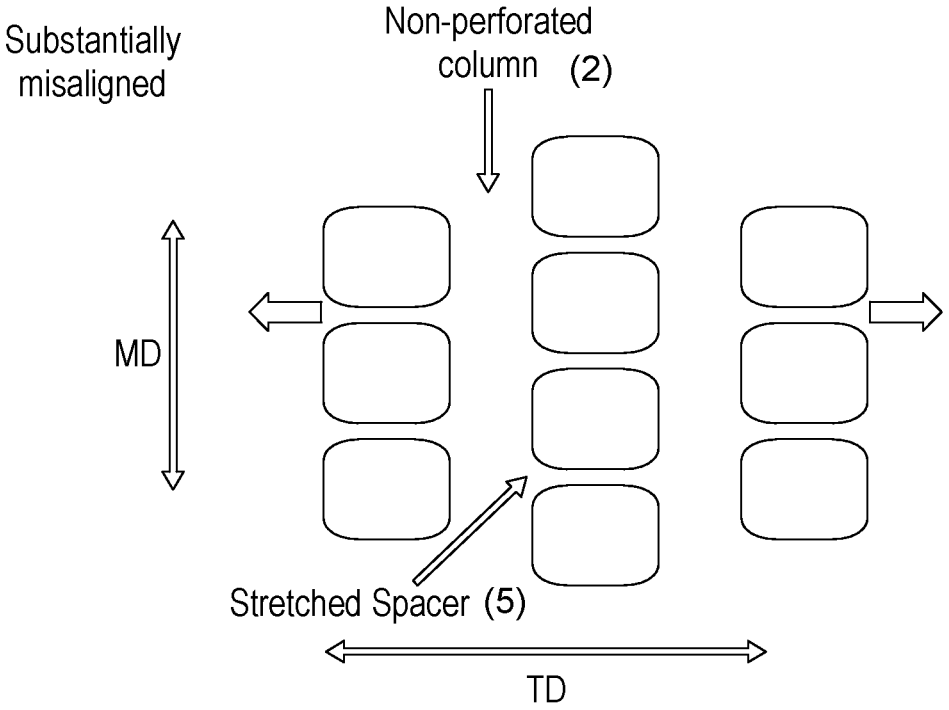
FIG. 2B shows a perforated film according to the invention with substantially misaligned perforations after prestretching of the spacers.

Prestretched spacers are shown in FIGS. 2A and 2B. In an embodiment the length of each spacer is equivalent to at least from 10% up to 500% of the width of its adjacent column of base film. In an embodiment, the length of each spacer is equivalent to no more than 300% of its width of the adjacent column of base film. In an embodiment the width of each spacer at the point where it is joined to its adjacent columns of base film is from 2 to 50 mm or preferably from 2 to 30 mm or from 5 to 30 mm.

In an embodiment the spacers are transversally oriented across the film.

Suitable properties for the film of the invention are as follows. The film preferably has a width of more than 250 mm, preferably more than 350 mm, even more preferably more than 400 mm.

In an embodiment, the width of the film is from 400 to 1300 mm, preferably from 400 to 700 mm or from 450 to 600 mm, and more preferably is about 490 mm.

In an embodiment, the thickness of the base film is from 4 to 40 µm, preferably from 10 to 16 µm, most preferably about 12 µm. The base film is generally of substantially uniform thickness, apart from in the regions of the spacers, wherein after selective TD pre-stretching the thickness is generally less. The base film is preferably flat, i.e. there are no regions of wrinkling or folding. In other words, the thickness of the base film in the columns which separate the spacers is generally of substantially uniform thickness. By this, is meant that the base film in these regions does not vary by more than 20%, preferably by no more than 15%, 10%, 5%, 3% or 2%. The base film can alternatively be referred to as "homogenous". This feature distinguishes the film of the invention from that disclosed previously, for instance, in references which disclose folding of the base film. Such folding can result in wrinkles which leads to a poor point of attachment between the base film and the reinforcing elements. This can lead to detachment of the reinforcing elements during stretching of the film, which reduces the film's strength and leads to unpredictable behaviour. This is avoided by use of the base film of substantially uniform thickness in the present invention.

After the transverse stretching of the spacers according to methods of the invention, the spacers may become thinner than the rest of the base film. The shape of the spacers may also change, becoming elongated. After prestretching, the spacers may also comprise irregularities in thickness, such as wrinkles.

When the spacers of the invention are pre-stretched, the spacers are elongated and the width of the holes (separating each spacer) increases, accordingly increasing the size of the holes in the film and increasing the proportion of the area of the film that they occupy. During this process, the holes may also change shape, for instance, from an elliptical to a square shape. This increases the aeration of the film per square metre and thus may advantageously increase the aeration on the pallet during use of the film.

The method of manufacture of the film in this invention may comprise the use of stretching disks. Previously, the heads of the stretching disks were round whereas in the present invention, they are typically square shaped. Furthermore, in the invention, the stretching takes place from the opposite side of the film. In the invention, the pressure is applied to the slippery rather than the sticky (cling) side.

During the selective prestretching of the spacers in this invention, base film material is transferred from parts of the non-perforated columns of base film into the regions bordering the spacers and thereafter in the spacers themselves. This then accommodates further extension of the spacers. Furthermore, as a result of this material transfer, the final mass included in the end to end length of the pre-stretched spacers is higher than that of the mass included in the end to end length of the spacers before prestretching took place.

The presence of reinforcing elements (alternatively referred to as reinforcing "strips") affects the degree to which the spacers can be stretched. During pre-stretching, material is transferred from the columns of base film into the spacer, and the reinforcing elements reduce the amount of material available to do this.

In an embodiment, the weight per square metre of the film of the invention is less than 100 $g/m^2$, preferably less than 60 $g/m^2$, more preferably less than 45 $g/m^2$, even more preferably less than 43 $g/m^2$ and most preferably less than 28 $g/m^2$. In an embodiment, the weight per square metre of the film of the invention is less than 42 $g/m^2$, preferably less than 38 $g/m^2$, more preferably less than 35 $g/m^2$, and most preferably less than 32 $g/m^2$. In another embodiment, the weight per square metre of the film of the invention is less than 30 $g/m^2$, and more preferably less than 25 $g/m^2$, less than 20 $g/m^2$ and most preferably less than 15 $g/m^2$.

The film of the invention is wider than the intermediate film and those typically used in the prior art, for instance, typically 10-70% wider. For example, a film according to the invention can have a width of around 580 mm, which compared to the width of an intermediate film of 455 mm, represents an increase in width of 27%.

In an embodiment each spacer has been prestretched to at least 100% elongation, preferably at least 200% elongation, and more preferably at least 300% elongation in the transverse direction of the film.

In an embodiment the elongation of each spacer is up to 95% of the elongation at break, preferably up to 90% of the elongation at break, even more preferably up to 80% of the elongation at break. The selective pre-stretching may take place to varying degrees and can alternatively be referred to as "partial prestretching" since the prestretching does not reach the maximum elongation capability of the spacer.

After the selective prestretching of the spacers, the film of the invention differs from the intermediate films of the prior art. For instance, the spacers are generally highly oriented. They may be stiffer and extend further in the TD (i.e. are longer) compared to standard commercial films.

In an embodiment the film of the invention comprises an offset wherein the columns of holes are offset in the longitudinal direction from the adjacent column of holes.

In an embodiment the offset is selected such that the ends of the spacers align transversally with a midpoint of a side of hole in the adjacent column of holes.

In an embodiment, the film of the invention comprises a misalignment wherein the holes of one column are misaligned in the transverse direction with respect to the holes of an adjacent column of holes.

In an embodiment, in the film of the invention the misalignment is selected such that the ends of the spacer strips align transversally with a midpoint of the side of a hole in an adjacent column of holes.

In an embodiment the spacer strips in one column of holes align transversally to the machine direction (MD) with the spacer strips in every other column of holes, forming a continuous row across the width of film. This may alternatively be referred to as a significant "parallel" arrangement of spacer strips.

In a preferred embodiment, the holes in two adjacent columns are substantially fully offset, such that they are misaligned.

The film of the invention typically comprises ULDPE, VLDPE, LLDPE, LDPE, m-LLDPE, MD-LLDPE, HDPE, PP, PP copolymers and other similar materials which are known in the art as suitable materials for plastic stretch films.

Figure 1B:
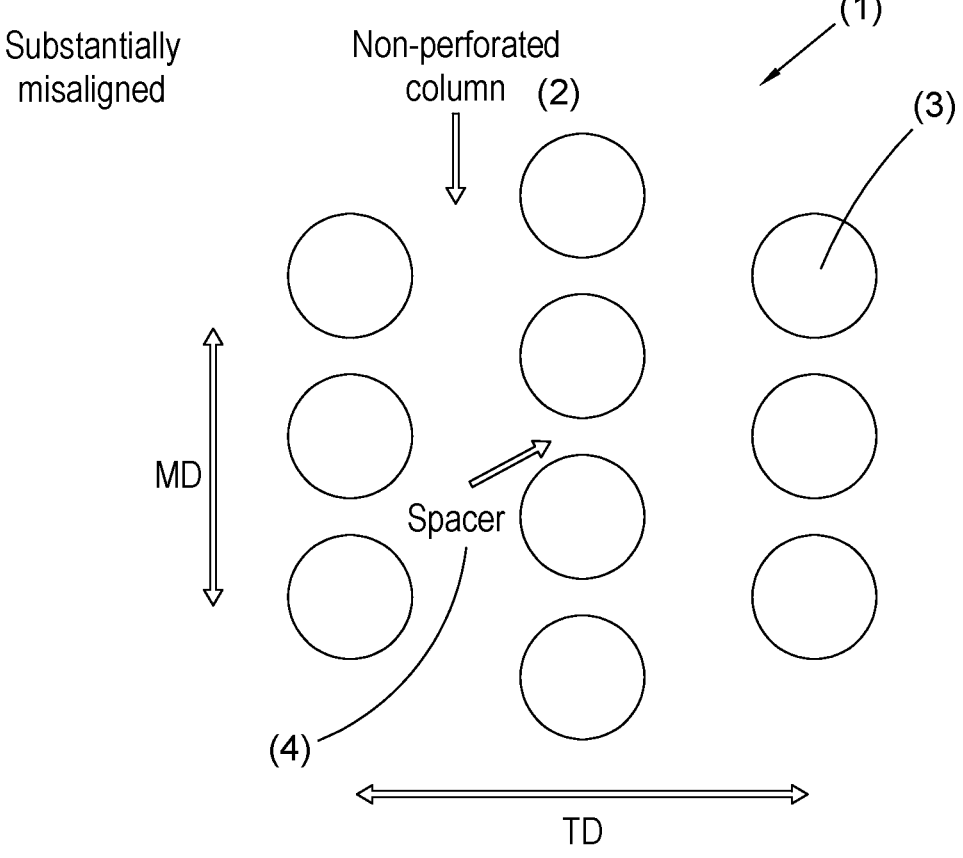
FIG. 1B shows an 'intermediate' perforated film with substantially misaligned (which may alternatively be referred to as "staggered") perforations without prestretched spacers.

FIG. 1B illustrates a drawing of a stretch film (1) with substantially misaligned (or alternatively termed "staggered") perforations without any prestretching, corresponding to an intermediate film as defined herein. It is clear from this illustration that the said film comprises perforated and non-perforated columns (2) along the longitudinal direction, MD, and localised spacers (4) directed transversely to MD columns. FIG. 2B then shows a perforated film with substantially misaligned perforations according to the invention with misaligned perforations after being subjected to a localised TD stretching at the spacers (5).

Figure 8:
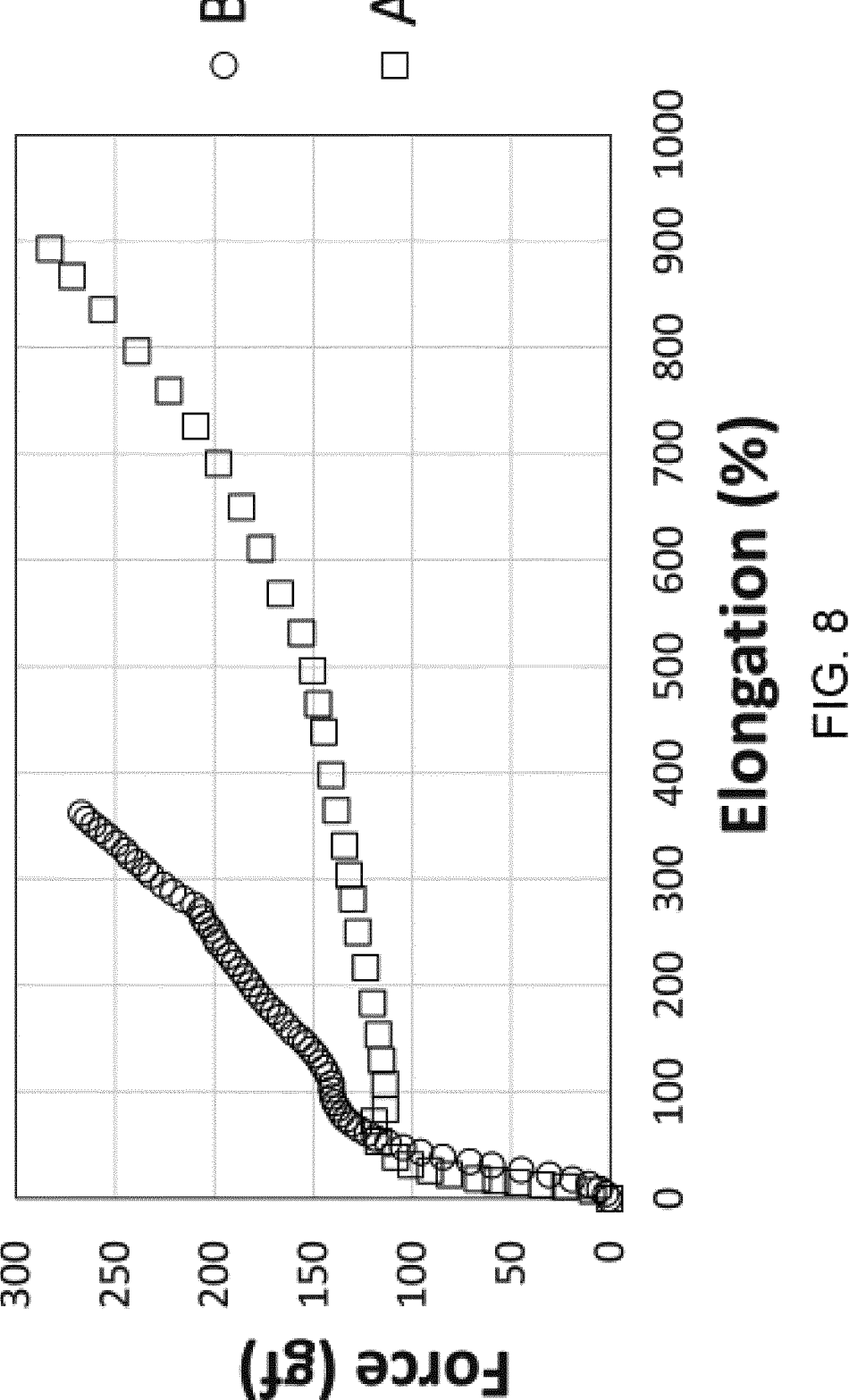
FIG. 8 shows the force-elongation curve of an individual spacer (not a non-perforated column) of an "intermediate" perforated reinforced film as found commercially (A) measured in a tensile test, compared to the selectively TD stretched individual spacer of a reinforced film according to the invention (B).

In an embodiment the spacers form continuous straight rows across the transverse direction of the film. FIG. 1A illustrates a drawing of a perforated stretch film with substantially aligned perforations (3) without any prestretching, i.e. corresponding to an intermediate film as defined herein. It is clear from this illustration that the said film comprises perforated and non-perforated columns (2) along the longitudinal direction, MD, and series of rows of spacers directed transverse to MD columns, in such a way that define the TD interspace between two perforations located in the same column. FIG. 2A then shows a perforated film with substantially aligned perforations according to the invention after being subjected to a localised TD stretching at the spacers. FIGS. 8-9 demonstrate the differences of the film of the invention compared to an intermediate film in TD properties while showing clearly that MD elongation of the film is unaffected compared to an intermediate film.

In an embodiment the holes cover less than 80% of the total surface area of the film. In an embodiment the holes cover less than 70%, or preferably less than 60%, most preferably less than 50% of the total surface area of the film. Preferably the holes cover less than 50% of the total surface area of the film.

In an embodiment, the holes can exhibit lips of material around their circumference. Such lips are accumulations of base film material produced during the perforation process.

In an embodiment, one surface of the film comprises a cling surface. In an embodiment, two surfaces of the film comprise a cling surface. Preferably, one surface comprises a cling surface. Preferably, the cling surface is arranged in use such that it is in contact with the goods to be wrapped. Such a cling surface provides additional tack to the film, enhancing the gripping of the film and its holding force.

In an embodiment each spacer comprises a flexibility bead 5a, said flexibility bead comprising a reservoir of additional stretchable base film material capable of being stretched in use. The term 'flexibility bead' refers to an area of a spacer which is less extended than the remainder of the spacer. Accordingly, the flexibility bead has a higher remaining elongation relative to the remainder of the spacer. The function of a flexibility bead is to act as a reservoir of additional stretchability in the TD. This advantageously allows the spacers to absorb vibrational forces during transportation and resist the initiation of catastrophic tearing.

A flexibility bead can be produced due to the set-up arrangement of stretching discs in the device employed for producing the film of the invention. For example, as the spacers pass over stretching discs, the film comes into contact with the curvature point of each stretching disc. This contact prevents homogeneous stretching throughout the whole length of each spacer. In essence, there is therefore less stretching being applied at these points relative to the parts of the spacers extending downward on either side of the stretching disc. Stretching discs are typically metal discs, preferably steel discs. The shape and size of a flexibility bead can be dictated by several variables, such as structure of film, geometrical characteristics of the film (i.e. thickness, width, length) or by modifying the geometry of the stretching discs.

In an embodiment the film of the invention comprises one or more reinforcing elements affixed to the base film between adjacent columns of holes and longitudinally oriented. In an embodiment the film comprises one reinforcing element affixed to the base film between adjacent columns of holes. Preferably, all reinforcing elements, when present, are substantially aligned (alternatively termed "parallel").

Figure 3A:
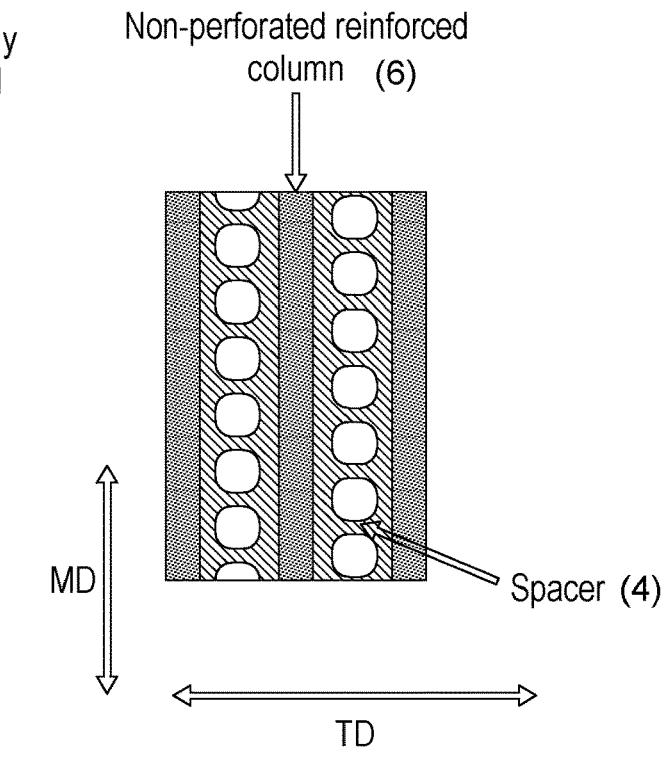
FIG. 3A shows an 'intermediate' perforated reinforced film with misaligned perforations and reinforcing elements applied on columns of non-perforated base film but without prestretching of the spacers.
Figure 3B:
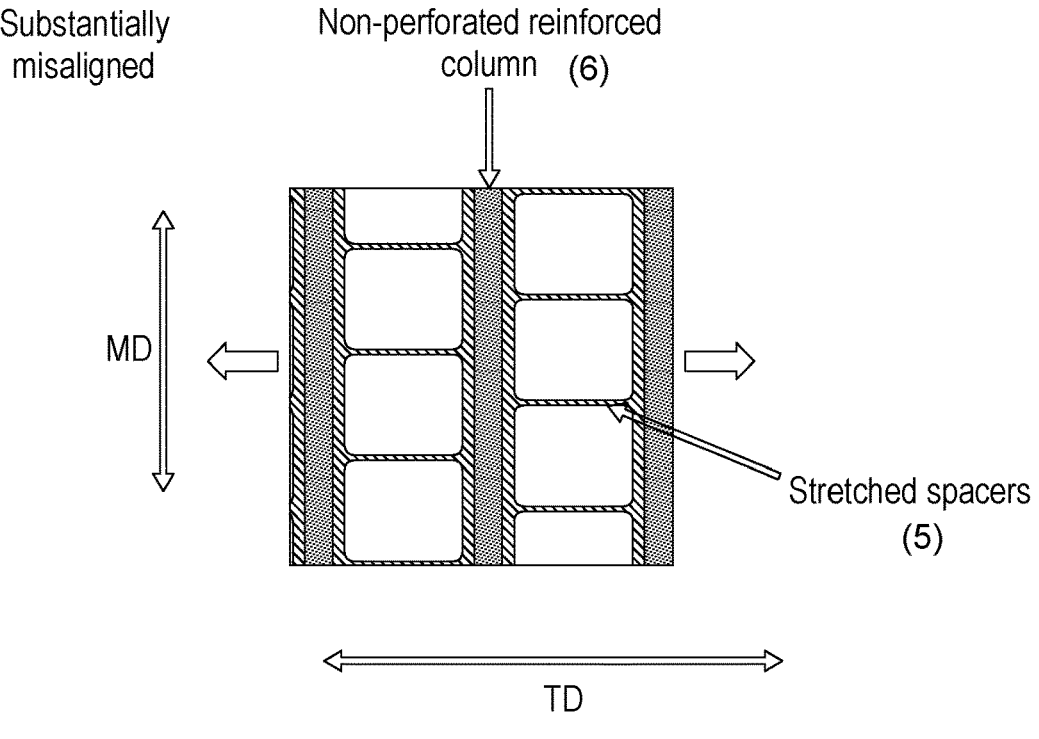
FIG. 3B shows a reinforced perforated film according to the invention with misaligned perforations after prestretching of the spacers.

In an embodiment, the film comprises one or more reinforcing elements affixed to the base film between adjacent columns of holes. Such a reinforcing element is made of a stretchable plastic film material and is arranged on and affixed to the base film in an area between two adjacent columns of holes. In an embodiment, the reinforcing elements are longitudinally oriented. As described above, the reinforcing elements, which may be different material than the base film, are fixed onto the base film in order to reinforce the product during its application. FIG. 3A shows an intermediate perforated stretch film comprising reinforcing elements, fixed at the surface of the non-perforated columns (6) of the base film (thus corresponding to an intermediate reinforced film of this invention). The perforations are substantially misaligned without localised stretching at the spacers. FIG. 3B then shows a perforated stretch film of the invention comprising reinforcing elements, fixed on the surface of the non-perforated columns of the base film (6), where the perforations are substantially misaligned and the spacers (5) are prestretched. The lateral edges on each side of the base film may be hemmed together. This hemming of the lateral edges of the stretch film provides additional reinforcement and prevents tearing at the edges of the film.

Another preferred embodiment of the invention has only the lateral edges of the base film hemmed, without the corresponding reinforcement elements. The hemming of the lateral edges of the base film also provides reinforcement at the edges of the film.

In accordance with a second aspect of the invention there is provided a process for producing a film according to the first aspect of the invention comprising:

providing an initial extruded plastic stretch film;
  perforating the initial plastic stretch film to form an intermediate plastic film comprising columns of holes in the longitudinal direction, wherein each hole is separated from an adjacent hole in the longitudinal direction by a spacer;
  and selectively prestretching each spacer in the transverse direction of the film.

In the process of the invention, selectively prestretching each spacer comprises arranging the initial extruded plastic stretch film such that the holes and spacers are directed over stretching discs. The stretching discs preferably are not round, but have an angular (e.g. square) surface profile. An angular disc enables the mass of the flexibility bead to be present only in the spot where the tip of the disc is in contact with the spacer, whereas a square disc causes the flexibility bead to be wider and extends along the whole width of tip of the squared disc such that the flexibility bead mass is higher.

In a preferred process of the invention, local heat treatment is used to form the holes.

In a preferred process of the invention, the initial extruded plastic stretch film is prestretched in the MD, i.e. after perforations are added. However, prestretching in the TD occurs only in the region of the spacers.

In a preferred process of the invention, there are subsequent steps of guiding the initial extruded plastic stretch film over a heating facility.

In a preferred process of the invention, the plastic stretch film is prestretched in the main direction after the perforations are generated and before or after the spacers are prestretched.

In a preferred process of the invention, the spacers are selectively prestretched to at least 100% elongation in the transverse direction of the film, preferably 150%, most preferably 200% elongation in the transverse direction of the film.

In a preferred process of the invention, the film produced has greater width than that of the intermediate film. In a preferred process of the invention, the film produced exhibits minimal neck-in when used to wrap a pallet. In a preferred process of the invention, the film produced exhibits uncompromised tensile properties in the longitudinal direction in comparison to those of the intermediate film. In a preferred process of the invention, the film produced exhibits a superior distribution of holding force when used to wrap goods in comparison to the intermediate film. In a preferred process of the invention, the film produced exhibits increased aeration in comparison to the intermediate film. In a preferred process of the invention, the film produced exhibits decreased weight per square metre of pallet coverage in comparison to the intermediate film.

The process according to the second aspect of the invention can be performed on an apparatus described as follows. For instance, a suitable apparatus for the manufacture of the stretch film according to the first aspect of this invention may include means for continuously selectively prestretching of the areas of a plastic stretch film travelling through the device. Said areas correspond to the spacers located at the interspaces between two consecutive holes positioned in the same column extending to the main direction, as detailed above. The spacers are selectively prestretched in the TD of the film in a process which may comprise a first rotating roller (7) and a second rotating roller (8) in an aligned arrangement with respect to the first rotating roller. The first roller comprises at least as many stretching discs (9) (typically steel discs), preferably 18 stretching discs, as there are spacers or columns of holes and between two adjacent stretching discs, comprises as many fixed plastic elements, preferably 17 fixed plastic elements, as there are the non-perforated columns of base film (1) (as seen in FIGS. 4A-D).

Figure 4A:
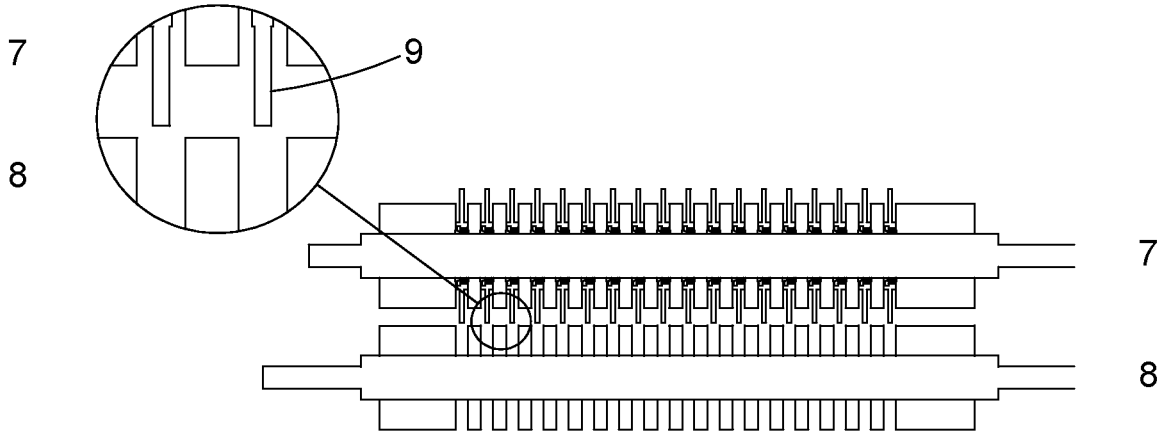
FIG. 4A shows a cross-section of a device used to perform prestretching of the spacers, comprising two rotating rollers (7 and 8). The master roller, also known as the first roller (7), comprises fixed stretching discs with known diameter which are spaced appropriately by plastic elements. The second roller (8) comprises plastic wheels which fit in the gaps between two stretching discs located at the master roller.
Figure 4B:
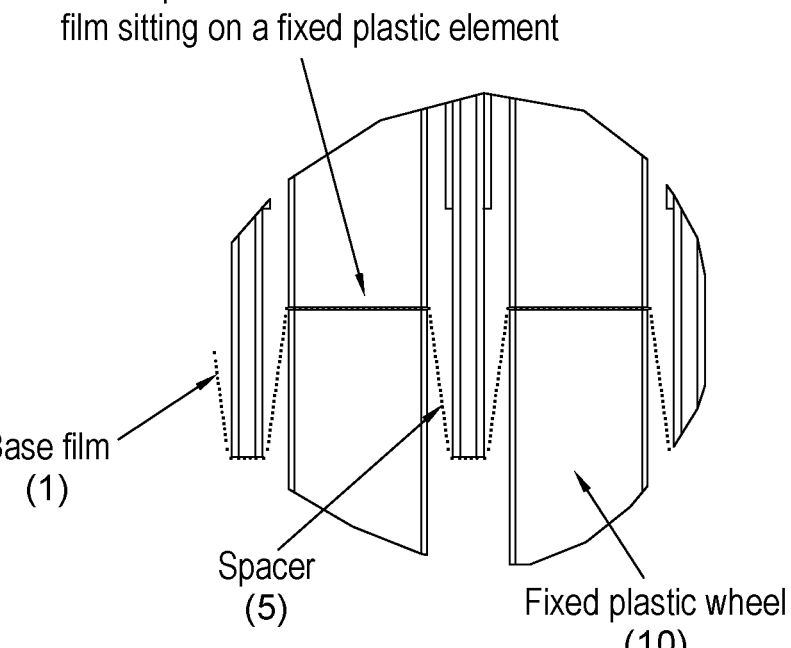
FIG. 4B shows enlarged drawings of a small section of the stretching rollers in closed position: the two rollers are in contact mode.
Figure 4C:
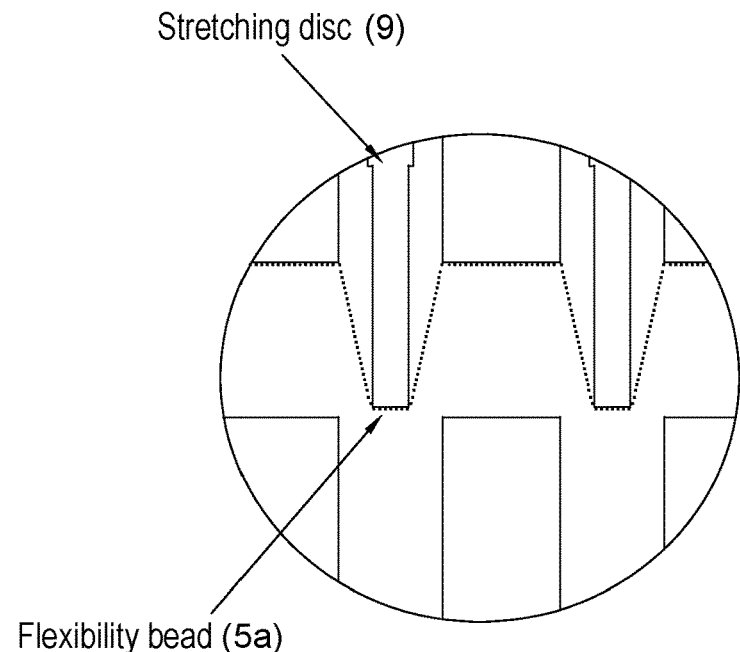
FIG. 4C shows enlarged drawings of a small section of the stretching rollers in open position: the two rollers are in non-contact mode.
Figure 4D:
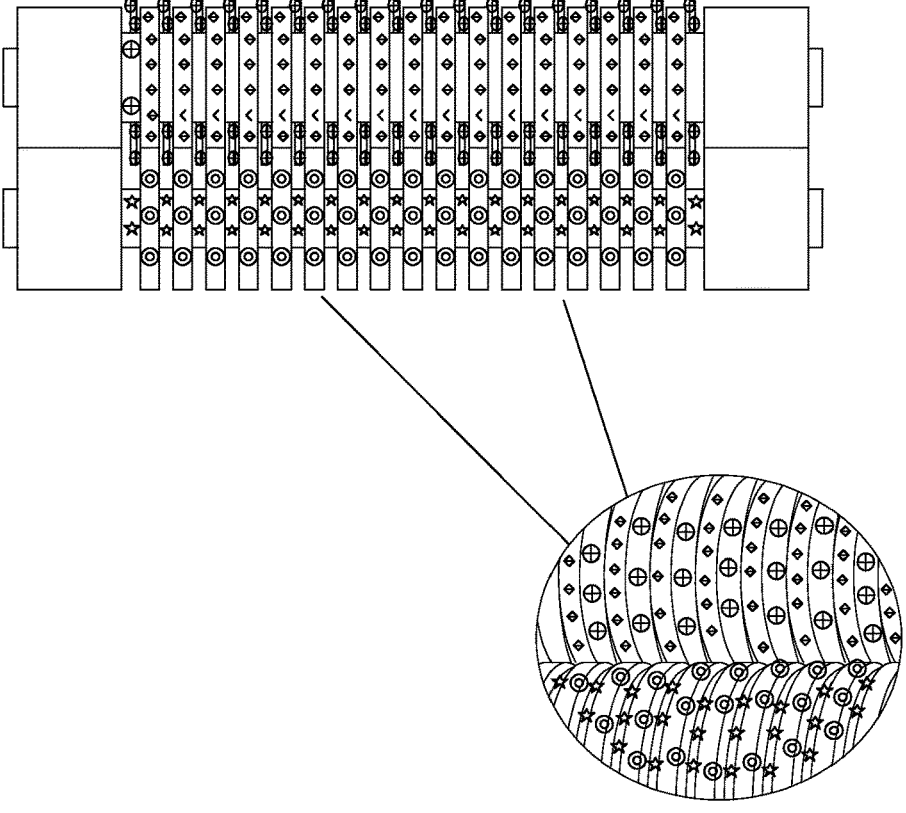
FIG. 4D shows an additional 3D schematic of the prestretching device.

The second roller comprises at least as many fixed plastic wheels (10) as there are the fixed plastic elements of the first roller and each plastic wheel fits in the gap between two adjacent stretching discs of the first roller. The first roller and the second roller may be in contact (FIG. 4B) or in non-contact (FIG. 4C) mode. As shown by FIG. 4C, the flexibility bead (5a) sits where the base film and top surface of the disc are in contact. The diameter of the stretching discs is higher than the diameter of the fixed plastic elements and the fixed plastic wheels. The diameter of each stretching disc is preferably 145 mm and the diameter of each fixed plastic element, and each fixed plastic wheel may be 110 mm.

Figure 4E:
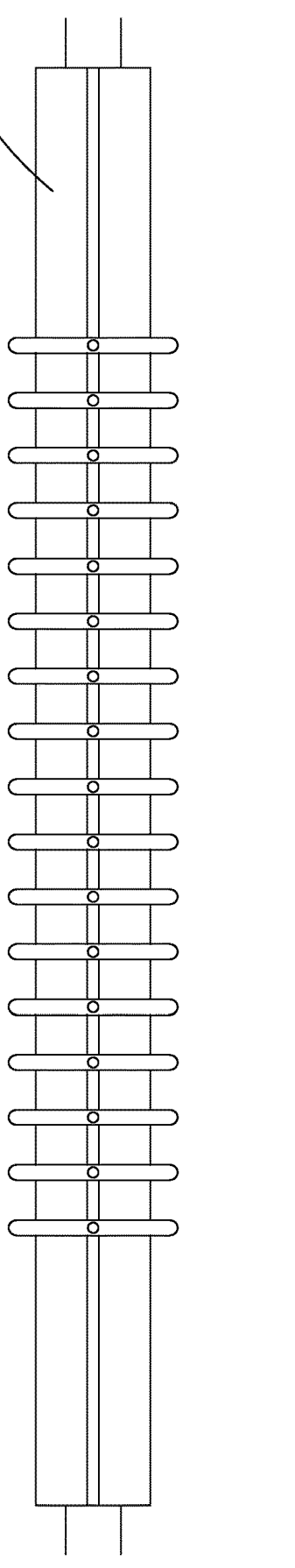
FIG. 4E shows a further component of the device used to guide the perforated film in and out of the stretching device.

After the first and the second rollers the plastic stretch film can be guided by two guide rollers (11) (FIG. 4E). Each guide roller comprises rubber rings, preferably 18 rubber rings, aligned with the spacers. The diameter and the width of each rubber ring are 75 mm and 7 mm, respectively.

The apparatus is characterised in that the fixed plastic elements of the first roller are coated with a material with a high frictional coefficient, and/or in that the fixed plastic wheels of the second roller are coated with a material with a high frictional coefficient.

Figure 11:
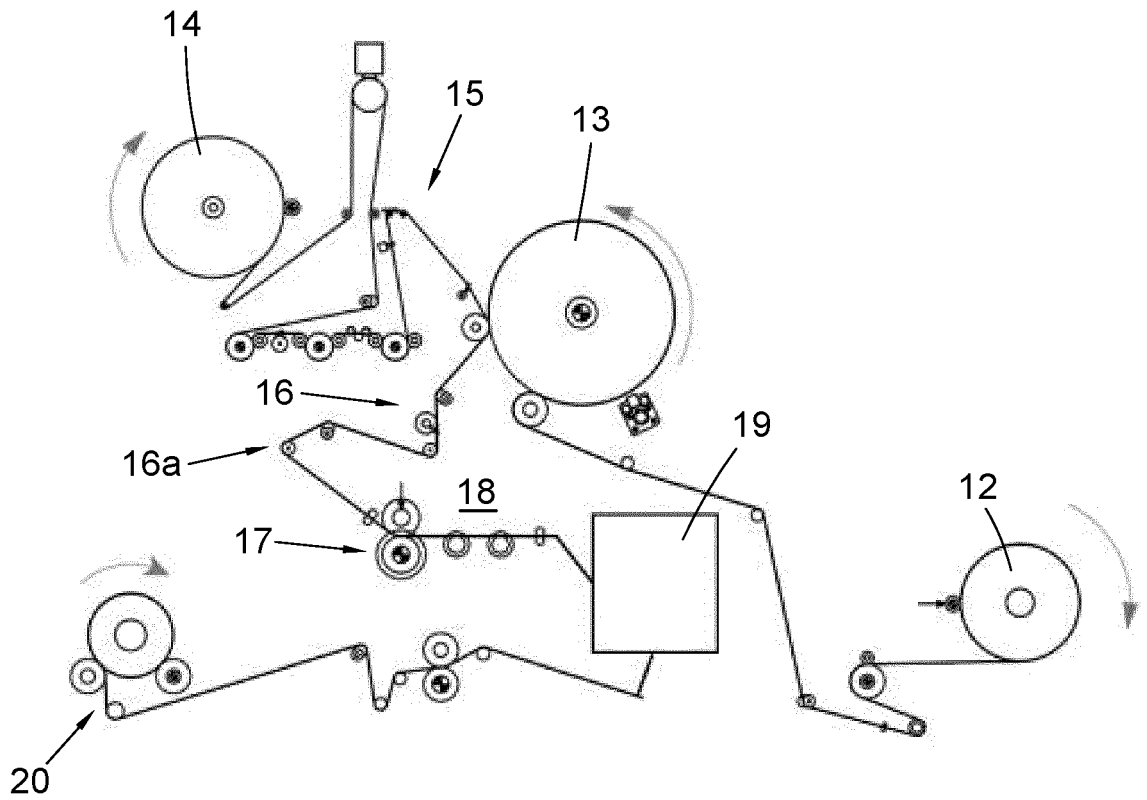
FIG. 11 shows a schematic diagram of the process setup used to produce a film according to the invention which comprises reinforcing elements.
Figure 12:
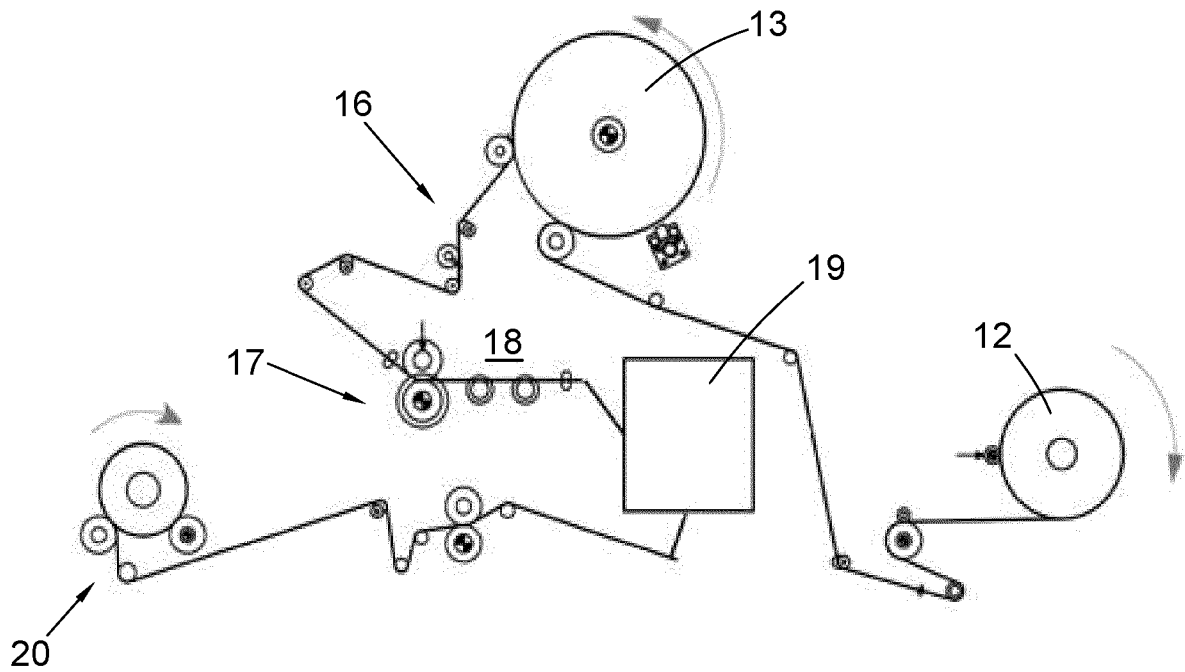
FIG. 12 shows a schematic diagram of the process setup used to produce a film according to the invention which does not comprise reinforcing elements

The complete production process of a film of the invention is described in FIGS. 11 and 12, which show schematic diagrams of the setup used to produce a film of the invention comprising reinforcing elements and the setup used to produce a film of the invention which does not comprise reinforcing elements respectively.

Referring to FIGS. 11 and 12, the cast or blown base film is continuously unwound from a roll in station 12, then the base film is guided to the perforation station 13. For the reinforcing element production, a second film is continuously unwound from another roll in station 14. The film is guided to station 15 where the film is slitted. Thereafter, the slitted film forms the reinforcing elements which may or may not be folded. The perforated film and the reinforcing elements meet each other immediately after stations 13 and 15. The lateral edges of the stretch film are hemmed at station 16, to prevent tearing at the edges (more details about hemming are available in patent EP1768837B1). Once the stretch film exits hemming station 16, it is guided through guiding rollers (16a, banana roller and a pair of small rollers) to the pre-stretching station 17, where the spacers are selectively TD prestretched. After the spacers have been selectively prestretched in the transverse direction, the film is guided through guiding elements (18) and rolls to stretching and annealing station 19. After station 19 the stretch film is guided to station 20 to form a roll. In case the stretch film is not reinforced, the stations 14 and 15 are omitted.

In accordance with a third aspect of the invention there is provided a thermoplastic film obtainable from the process of producing a thermoplastic film according to the second aspect of the invention.

In accordance with a fourth aspect of the invention there is provided a use of a thermoplastic stretch film according to the first aspect of the invention or a thermoplastic film obtainable according to the third aspect of the invention for packaging. In an embodiment, the packaging applications comprise silage applications, manual packing applications and mulch applications. In a preferred embodiment, the use of the thermoplastic stretch film comprises silage film. In a preferred embodiment, the thermoplastic stretch film in use as packaging is applied for unitizing goods.

Each hole in a column of holes is separated from the adjacent hole in its column by a spacer. A spacer is a narrow band of base film material separating two adjacent holes within the same column of holes and connecting the longitudinal columns of base film. In an embodiment, the spacers in adjacent columns are separated by columns of base film. In an embodiment, the spacers in adjacent columns are separated by holes. Preferably, the spacers in adjacent columns are separated by non-perforated columns of the base film.

The spacers, being located between two holes which are longitudinally oriented, participate minimally in the longitudinal stretching process. They can therefore be selectively stretched in the transverse direction without influencing any later longitudinal stretching. Since the spacer contribution to longitudinal extension is minimal, the targeted selective prestretching in the TD results in a perforated stretch film that maintains its properties in the MD, i.e. the elongation in the MD is not compromised. The width of the spacers is the distance between two adjacent holes in the same column. The resultant reshaped film exhibits improved wrapping properties during the unitisation of packaged goods on a pallet.

In the invention each of the spacers is prestretched to a value up to its elongation at break. In an embodiment, each of the spacers is prestretched up to 50% of the elongation at break, preferably 60%, more preferably 70%, even more preferably 80%, most preferably 90%. Elongation at break for a spacer of the invention or any other perforated film can be measured from a force-elongation curve measure in a tensile tester.

In a preferred embodiment each of the spacers is prestretched up to its natural draw ratio (NDR) elongation area. This is the area where the optimal balance of properties of all types (high aeration, width extension, necking reduction, high MD stretchability, film stiffness control, optimum application results, film forgiveness to failure etc.) is achieved. Above the NDR area, the spacers become unstable and the connectivity and structure of perforated stretch film may catastrophically break down. Consequently, if used to cover a pallet, the unitized goods on the pallet may become loose during transportation (where goods are subjected to significant vibration). In such cases, the wrapped load could be damaged, while also jeopardizing the safety of other accompanying goods or travellers.

The partial targeted prestretching of the spacers advantageously controls the properties of the resulting film. The degree of prestretching of the spacer is important, since it affects the behaviour and properties of the resultant film. For instance, referring to FIG. 10 which shows a typical force-elongation curve, the spacer may be prestretched to within area A, B or C depending on the intended properties desired by the user. If a user is interested in obtaining maximum width, the strain hardening zone (C) could be targeted. On the other hand, if a user is more concerned about sensitive and fragile load, the spacers could be extended to the elastic (A) or plastic zones (B).

Where maximum film width is desired by the user, i.e. where the spacers are prestretched into the hardening zone, the film width can reach maximum values. The film width is more than 15%, preferably more than 20%, most preferably more than 30% greater than a comparable film not comprising prestretched spacers (an 'intermediate' film).

Retaining the stretchability of a film, increasing the film width and reducing necking during application are key advantages of this invention. Stretchability is a property that controls (along with other parameters) the holding capabilities of the packaging film during wrapping. It determines the number of pallets that may be wrapped per metre of wrapping film, which in turn influences cost and the volume of plastic waste produced. It also reduces stretch film failure during packaging, reducing cost and increasing pallet security during the loading and transportation of goods.

Elongation can also be referred to as a percentage of the elongation at break, where the break point is known. Herein reference to 'elongation' alone denotes a length at a certain extent of deformation.

Films according to the invention can be produced by the following process, which is best understood with reference to FIGS. 11 and 12. In an embodiment comprising a film comprising reinforcing elements, cast or blown base film is continuously unwound from a roll. The base film is then guided to the perforation station. Another film is continuously unwound from another roll, in order to produce reinforcing elements. At this point the film is cut into reinforcing elements. The reinforcing elements may be folded. The perforated film and the reinforcing elements then come together. The lateral edges of the stretch film are hemmed at the hemming station, in order to prevent tearing at the edges (methods of hemming films are well known in the art, for example as described in EP1768837B1).

Once the stretch film exits the hemming station, it is guided through guiding rollers (banana roller and a pair of small rollers) to the prestretching station, where the spacers are selectively stretched in the TD. After the spacers have been selectively stretched in the TD, the film is guided through guiding elements and rolls to the stretching and annealing station. After this, the film is guided to form a roll. In an embodiment of the invention where the thermoplastic stretch film is not reinforced, the above-mentioned steps referring to the reinforcing elements are omitted.

Preferably, the reinforced thermoplastic film of the present invention comprises a base film which is an extruded multi-layered stretchable or prestretched film. These are further described in our previous patent publication WO2011/026954. The reinforcing elements and the base film materials may comprise polymers or copolymers, preferably synthetic polymers. Preferably the polymers are polyolefins or non-polyolefins such as polyamides or polyesters. Mixtures of different polyolefins or mixtures of polyolefins with non-polyolefins can also be used.

Perforation may be performed by different means, among them e.g., by punching, die cutting, laser radiation, thermal irradiation, or some combination of them. Preferably, perforation is performed by thermal irradiation during production of the film, which minimises any wasted film material and reduces scrap production. As mentioned above, material accumulation around the circumference of the holes can lead to lip formation, where such lips comprise accumulated heated base film material produced during the perforation process.

Where reinforcing elements are applied to the film, the reinforcing elements are preferably bonded onto the base film through heat fusion. During deposition, the reinforcing elements are generally at a temperature higher than room temperature and close to their crystallisation range, that is, preferably 1-100° C. above their crystallisation point, more preferably 1-80° C., more preferably 10-60° C., more preferably 20-50° C. The crystallisation point may be determined by means of Differential Scanning calorimetry with a heating rate of 10° C./min.

Further details of perforation methods, film composition, and methods for forming the base film can be found in our previous patent publication WO 2011/026954.

In an embodiment a multiplicity of reinforcing elements may be placed and fixed on the intermediate perforated film. The reinforcing elements comprising stretchable polymeric material are longitudinally oriented and at least one element is situated in a column of base film not comprising holes.

It is an objective of this invention to provide a stretch film that is wider than an intermediate perforated film, which as defined above is an equivalent perforated film which does not comprise prestretched spacers (i.e. that has 'non-prestretched' spacers).

The holding force exerted on palletised goods is important. Holding force will define the suitability, or lack thereof, of a packaging film. The need for appropriate holding force will dictate the choice of polymer formulation, the cost of raw materials used and will determine the number of wraps needed for the load to be secure on the pallet. The holding force of the film of the invention will typically be from about 5 to about 30 kgf (kilogram-force: about 49 to about 295 N).

Holding force is not the only parameter dictating the efficacy of pallet wrapping. Low necking effect permits reduction of the number of wraps needed during pallet product unitisation, thus a lower amount of film needed per pallet, and better airflow in and out the wrapped pallet. Low necking also allows more effective coverage of the wooden part of the pallet, thus helping to avoid transportation and safety problems. It is an objective of the invention to provide a film which applies more homogeneous distribution of forces around the pallet, which thus increases the stability of the pallet while at the same time reducing the need for wrapping material.

It is known in the prior art that the TD stretching of a film reduces its stretchability and performance in the MD. This happens due to the conservation of mass of the film. If a film is stretched in one dimension, as mass must be conserved the volume must change, i.e. one of the other two dimensions must change. This manifests in a film reducing in length and/or thickness, until a point is reached at which the film breaks. As detailed above, in this invention, the partial targeted prestretching of the spacers does not considerably affect the properties of the film along the MD during application. The spacers, however, do contribute substantially to the TD properties. Stretching the spacers results in a stiffer and more isotropic film with better balanced mechanical properties and a superior distribution of holding forces. For instance, localised strong holding forces often result in the failure of packaging around paper boxes. The distribution of force in the invention will reduce this problem. The increased stiffness in the film TD will also reduce load movements during transportation.

Thus, the invention provides a stretch film which is wider than an intermediate perforated stretch film which does not comprise prestretched spacers, whilst maintaining the main direction film properties, especially the stretchability.

It is a benefit of the invention that air permeability (or aeration, %) is increased, which decreases the time needed to balance the environmental conditions within and without the wrapped goods. In other words, superior aeration allows the goods inside some wrapping to acclimatize with the surrounding conditions more readily and avoids hermitization. It is a benefit of the invention to provide the maximum pallet coverage with the minimum amount of film while maintaining good stability and secure loading.

It is another objective of this invention to provide a stretch film capable of effectively wrapping a wooden pallet and thus delivering more stable and secure unified products wrapped on a pallet. For example, an extruded stretch film may have a width of 500 mm and may be wrapped around an approximately 510-520 mm paper tube of diameter 50-100 mm. Once perforated, the intermediate perforated film might have a width of 455 mm, which, due to effect of necking, is further reduced during application to a width in the range 300-450 mm. The narrowing of the wrapping film prevents the film from achieving an effective grip on the wooden pallet beneath the goods, as the reduced width does not extend far enough over the wood. As such, the unitized products wrapped in intermediate film are looser on the pallet, creating unsafe and unstable loads. The film of the invention is less susceptible to the effects of necking, and improves the safety and stability of loads on the pallet.

The invention will now be illustrated by the following Examples, in which the following points apply.

Examples

All values disclosed are the mean average value, unless otherwise stated.

Weight of film: this is calculated by weighing one meter length of the fully extended film and it is expressed in grams (g) or in grams per square meter (g/m²).

Weight of specimen: is the weight of the film for a length equal to the grip-to-grip distance, comprising the same number of non-perforated and perforated areas and the same number of spacers as the tested specimen, and it is expressed in grams (g).

Displacement: the length change when a pulling/tensile force is applied to the material, expressed in millimetres (mm).

Stretchability: the ability of the polymer to be deformed upon the application of a pulling force until it breaks. It is measured as a percentage relative to the initial length, i.e.:

$$\text{Elongation (\%)} = \frac{\text{Change in length}}{\text{Initial length}} \times 100$$

Stiffness: the ability of a material to resist deformation when a pulling/tensile force is applied to the material. It is defined by the machine direction (MD) mechanical properties, such as Force and Elongation at NDR, and Force and Elongation at Break and the transverse direction (TD) mechanical properties, such as Force and Elongation at Break and the area under the force-displacement graph, as further defined below. A packaging film should have an adequate holding force and stiffness which is suitable to the intended application.

Figure 10:
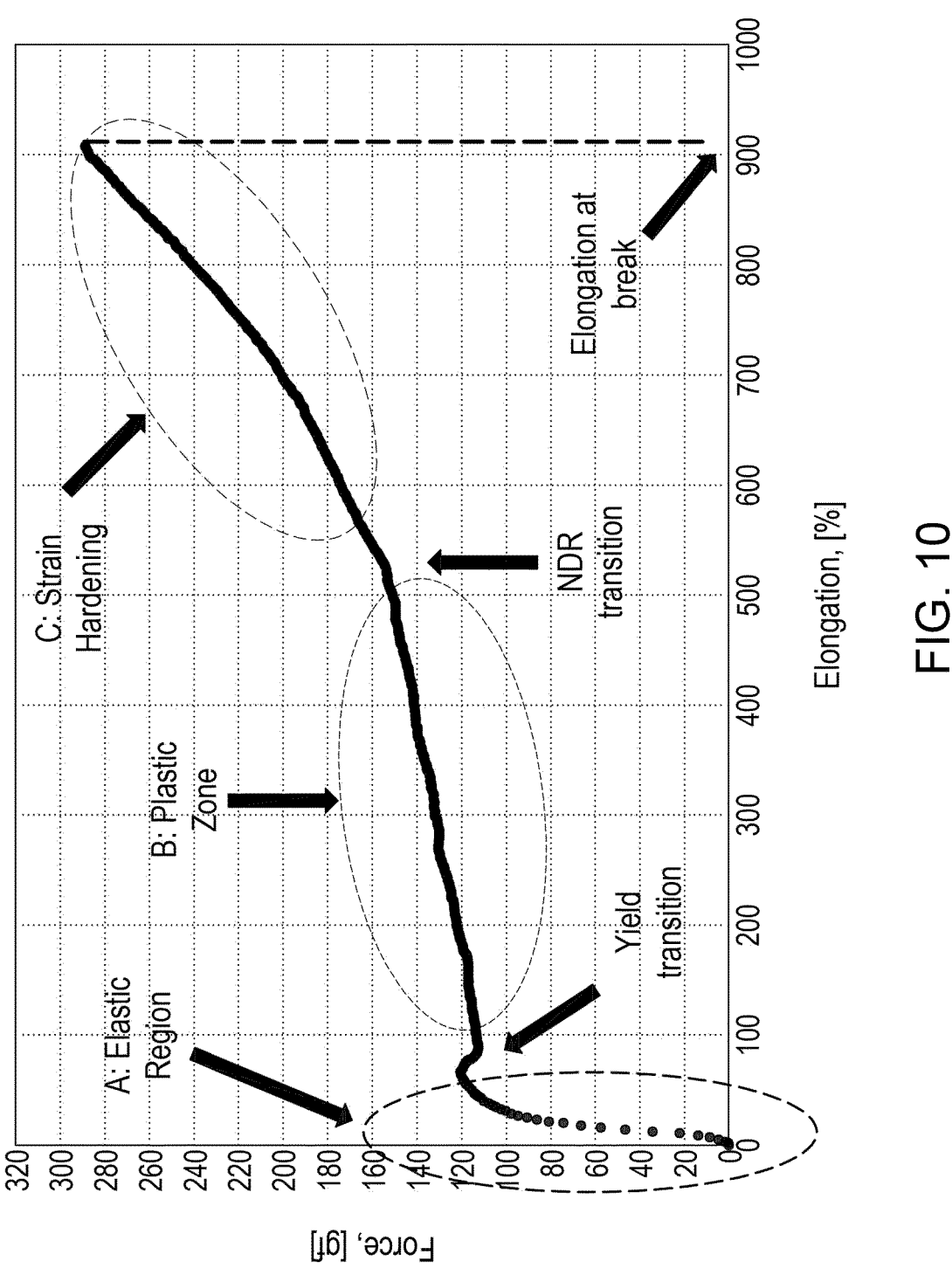
FIG. 10 illustrates a typical force-elongation curve of a polymer under tension.
Figure 14:
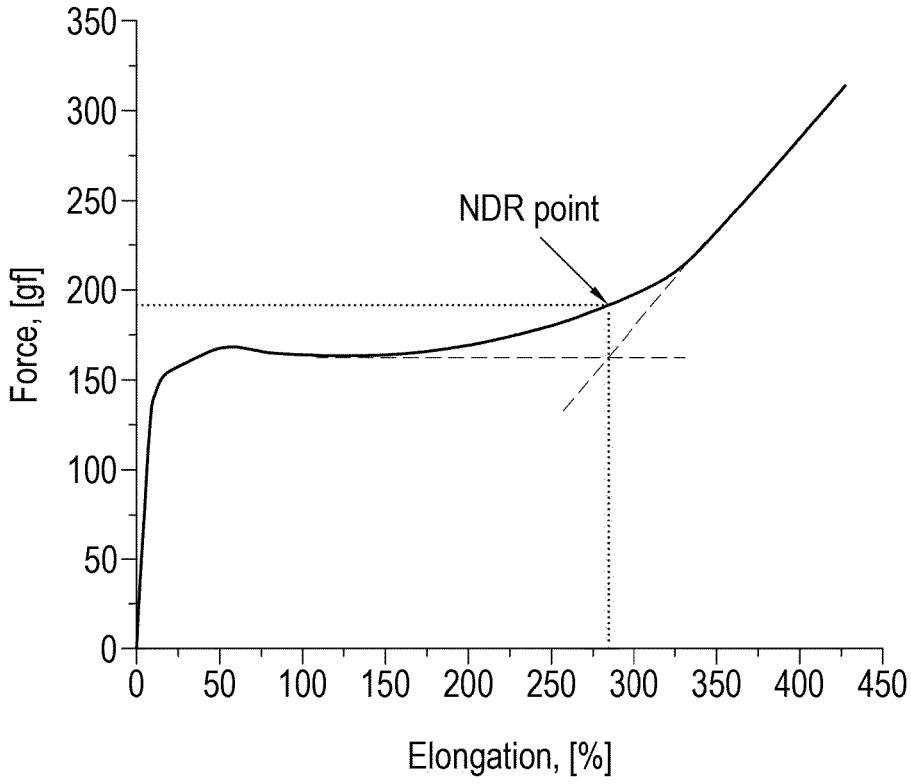
FIG. 14 shows a graph to measure the NDR point.

Natural Draw Ratio point (NDR): point of preferred maximum elongation for the application of a packaging film (industrial guaranteed stretching). It is the end of plastic zone (B) and the beginning of strain hardening zone (C), as shown in FIG. 10. The NDR point is determined from MD tensile force-elongation curves, by drawing two tangent lines from the almost linear part of the yield plateau and the strain-hardening region, as illustrated in FIG. 14. The force (in gram-force, gf) and the elongation (%) at NDR can also be determined from this curve, being the y and x coordinates at the NDR point respectively (as shown by the dotted lines). The force at the NDR point correlates well with the holding force that the packaging film can exert when wrapped around a load. A more detailed discussion of the NDR point can be found in WO 2004/022634.

Elongation at Break: the percentage increase in length that a material will achieve before breaking and indicates the ability of a material to undergo significant deformation before failure and it is a dimensionless number.

Force at break: the maximum amount of tensile force that a material can withstand before breakage, and it is expressed in gram-force (gf).

Force at break/weight: the maximum amount of tensile force that a material can withstand before breakage divided by the weight of the specimen, it is expressed in gram-force per gram (gf/g).

Force to 1$^{st}$ breakage: the maximum amount of TD tensile force that a material can withstand before the breakage of the 1$^{st}$ spacer(s), and it is expressed in gram-force (gf).

Force to 1$^{st}$ breakage/weight: the maximum amount of tensile force that a material can withstand before the breakage of the 1$^{st}$ spacer(s), divided by the weight of the specimen, it is expressed in gram-force per gram (gf/g).

Energy to break the 1$^{st}$ spacer: the area under the TD curve of the force versus displacement and represents the total work until the breakage of the 1$^{st}$ spacer(s), it is expressed in Joules (J).

Initial width of the film: the width of the product film wrapped around the core, expressed in millimetres (mm).

Film Width fully extended: the width of the film when it is fully extended at TD, and it is expressed in millimetres (mm).

Width of the film on pallet corner: the width of the film measured on the 1$^{st}$ pallet corner, and it is expressed in millimetres (mm).

Neck-in on pallet corner: the shrinkage of the film measured on the 1$^{st}$ pallet corner, and it is expressed in millimetres (mm).

Neck-in % on the pallet: the percentage (%) shrinkage of the film measured on the 1$^{st}$ pallet corner over the initial width of the film (a dimensionless number).

Wooden Pallet Coverage: the percentage of the width of the wooden part of the pallet that it is covered by a film stretched to an elongation % equal to the elongation at NDR, over the total width of the wooden part of the pallet (a dimensionless number).

Example 1: Application Properties of Films

A ROTOPLAT 708 commercial packaging wrapping machine provided with independent pre-stretching cylinders which allow applying different draw ratios up to a maximum of 400% was used to make the necessary measurements on the films tested herein. For all measurements, the films were prestretched at 200% elongation. The pallet turning speed was 10 rpm and the total number of wraps was 12.

The results of the various tests are presented in the tables below.

Table 1 provides details of the products tested. The external strip width is the width of each of the two strips at the edges (lateral non-perforated edges).

TABLE 1

| | | | Non- | | Film |
| | | | perforated | Film | Thickness |
| | Initial | External | column | Thickness | at Base + |
| | Film | Strip | width | at Base | Strip, |
| | Weight | Width | Width | (mm) | (μm) | (μm) |
| | of film, | (mm) | (mm) | [22] | [23] | [24] |
| Product | g/m² [1] | [1] | [21] | | | |
|---|---|---|---|---|---|---|
| A | 15.3 | 455 | 23.3 | 12.3 | 9.5 | 70-130 |
| B | 11.8 | 488 | 21 | 11.1 | 9.5 | 70-130 |
| C | 11.8 | 558 | 21 | 11.1 | 9.5 | 70-130 |
| D | 18.9 | 456 | 25.5 | 13 | 10.5 | 70-130 |
| E | 14.0 | 488 | 20.5 | 12 | 10.5 | 70-130 |
| F | 14.0 | 585 | 20.5 | 12 | 10.5 | 70-130 |

All of the products A to F in Table 1 are perforated stretch films comprising a plurality of reinforcing elements. The base film and the reinforcing elements of the stretch films comprise polyolefins, ethylene copolymers, propylene copolymers, or a mixture thereof. The film composition used for producing the reinforcing elements can be the same or different to the composition used to produce the base film. The film composition used to produce films A to F is the same. During their production process, the base of the films A and B is more prestretched along the machine direction than the base of the films D and E, therefore their total film weight and base film thickness are lower. Moreover, the films A and B have a similar prestreching level, and the films D and E have a lower, but similar prestretching level.

Figure 6A:
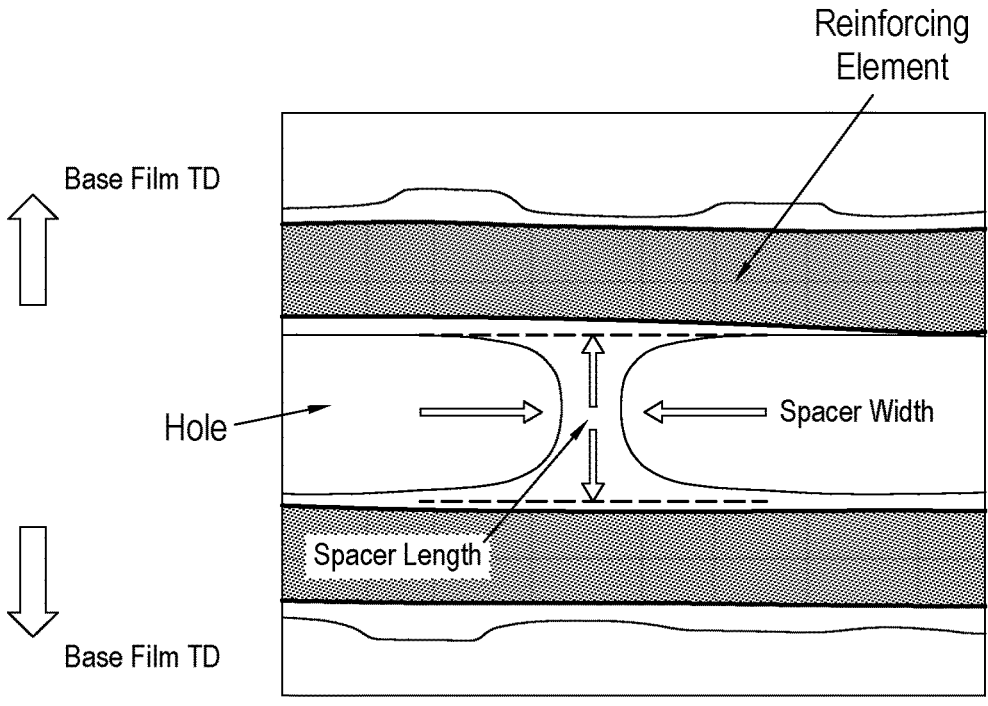
FIG. 6A is an expanded view of a sample of an "intermediate" perforated reinforced film.

Products A and D are "intermediate" films, i.e. films containing spacers which have not been stretched (a schematic is shown in FIG. 6A).

Figure 7A:
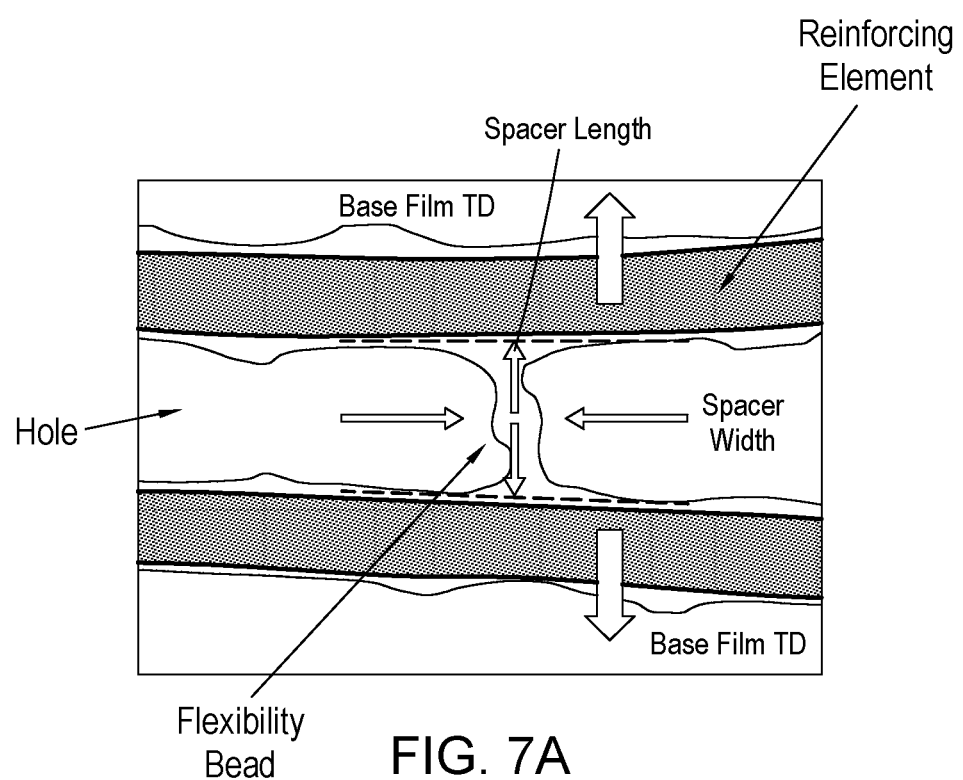
FIGS. 7A and 7B correspond to FIGS. 6A and 6B, after partial TD stretching of the spacers has taken place.

Products B and E are films according to the invention, wherein the spacers of "intermediate" products A and D, respectively have been selectively TD prestretched (corresponding for instance to the product shown in FIG. 7A).

Products C and F are films according to the invention wherein Products B and E respectively, have been fully extended in the transverse direction (corresponding for instance to the product shown in FIG. 5A).

Therefore, comparison must be made between A, B, and C and separately between D, E and F.

Figure 5:
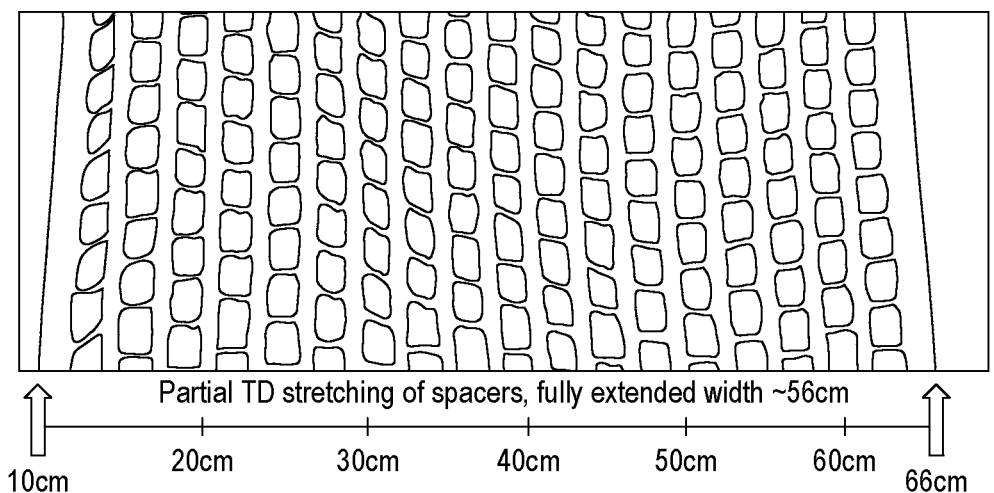
FIG. 5 shows the measurement of the widths of a film according to the invention (a) and an intermediate film (b).
Figure 5:
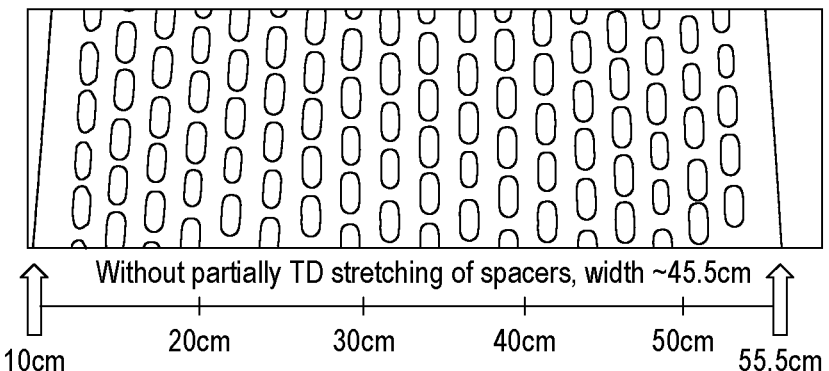
Figure 13:
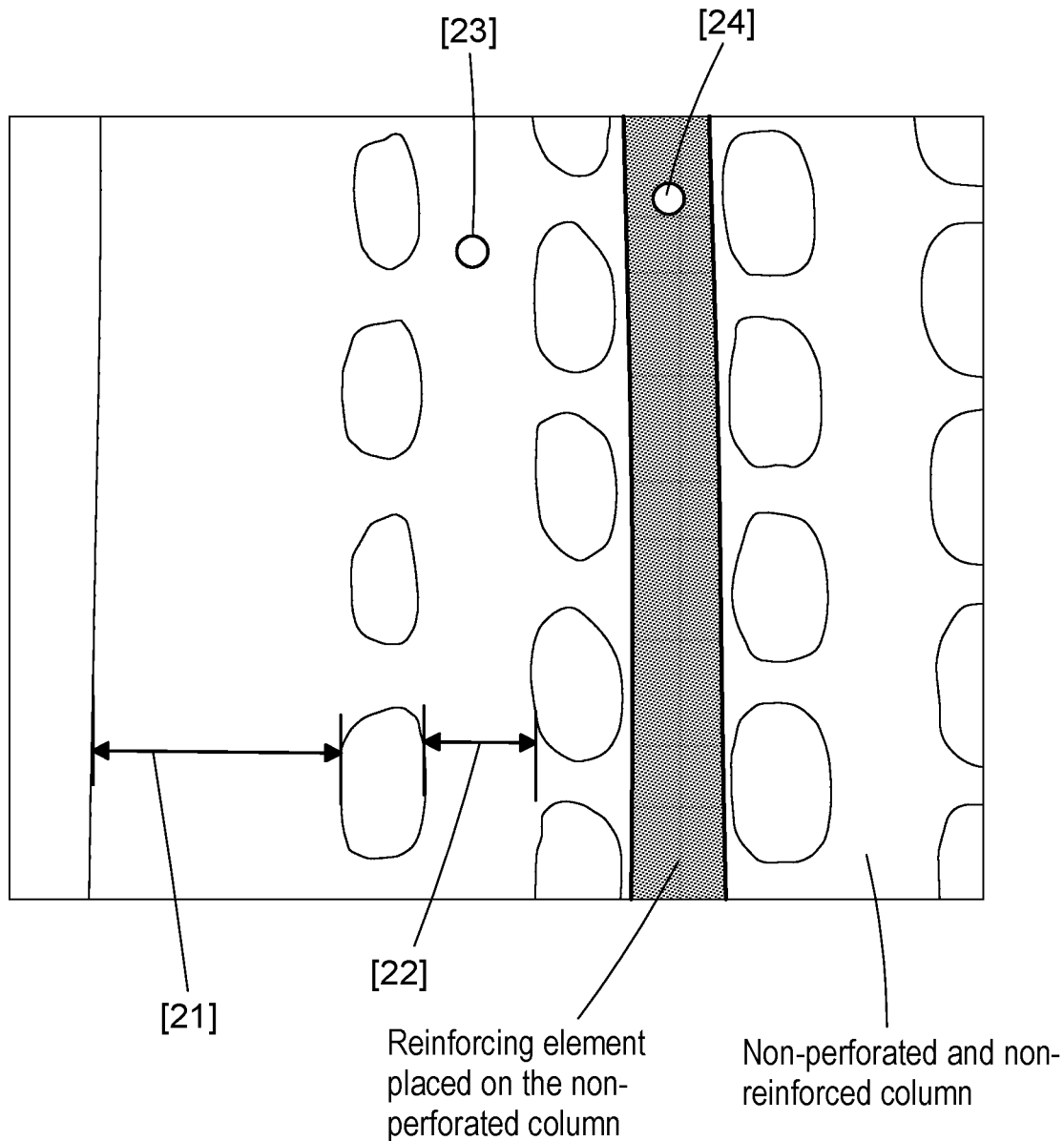
FIG. 13 shows a film with the various measurements illustrated, wherein labelled is: the external strip width (21), the non-perforated column width (22), the film thickness at the base (23) and the film thickness at the base and the strip (24).

FIGS. 5 and 13 illustrate how various dimensions in the table above were measured.

Table 2 below illustrates the TD properties of the films from Table 1, where the specimens tested were prepared according to the tensile tests outlined below in Example 2.B. The Elongation at break for TD represents the first spacer failure and not the catastrophic break of the whole specimen. The energy to break is the work needed to elongate the perforated film to the breaking point of the first spacer. As shown by the results below, the energy to break the first spacer is lower for films B and E than A and D. This is because the spacers of films B and E have already been selectively TD stretched and therefore when further stretched in a tensile test, these films exhibit a pseudo-plastic zone (FIG. 10). Moreover, the maximum force before first spacer (bridge) breakage of the intermediate and the films according to the invention do not significantly vary among each other. However, the higher stiffness, the greater aeration and the lower necking of films B and E, as shown by the results in Tables 3 to 6 below, demonstrate overall superiority over the intermediate films A and D.

Notably, a force normalization, Force/weight of specimen, kgf/g, is needed to remove the weight factor since not all specimens have the same weight.

TABLE 2

| | | | | | Max Force | |
| | Weight of | | | Max Force | before 1st | Energy |
| | film g/m² | Weight of | Elongation | before 1st | spacer | to break |
| | (Measured | specimen, | @ 1st | spacer | breakage/ | the 1st |
| | on | (Measured on | spacer | breakage, | weight of the | spacer, |
| Product | balance) | balance), g | breakage, % | kgf | sample, kgf/g | J |
|---|---|---|---|---|---|---|
| A | 15.3 | 0.38 | 213% | 1.13 | 2.98 | 1.96 |
| B | 11.8 | 0.35 | 151% | 1.00 | 2.86 | 1.27 |
| D | 18.9 | 0.34 | 156% | 0.91 | 2.68 | 1.31 |
| E | 14.0 | 0.35 | 100% | 0.91 | 2.61 | 0.82 |

Table 3 below shows the MD properties of the films from Table 1, where the specimens tested were prepared according to the tensile tests outlined below in Example 2.B. The results in the table show that the MD properties of the intermediate and films according to the invention do not significantly vary amongst each other, thus the TD stretching of the spacers does not affect the MD properties of the films.

TABLE 3

| | | | | Force @ NDR, kgf | Force / weight of specimen, kgf/g | | Force @ Break, kgf | Force @ break/ weight of specimen, kgf/g |
|---|---|---|---|---|---|---|---|---|
| Product | Weight of film, g/m² | Weight of specimen, g | Elongation @ NDR, % | | | Elongation @ break, % | | |
| A | 15.3 | 0.27 | 142% | 5.7 | 21.2 | 280 | 10.0 | 37.2 |
| B | 11.8 | 0.25 | 142% | 5.4 | 21.2 | 280 | 9.8 | 38.8 |
| D | 18.9 | 0.30 | 212% | 5.3 | 17.4 | 390 | 9.7 | 31.8 |
| E | 14.0 | 0.30 | 202% | 5.2 | 17.1 | 370 | 9.2 | 30.3 |

Table 4 below shows the difference between the initial width of the film and the width at the NDR and provides information about the necking that the film undergoes during elongation at NDR. The results show that the films according to the invention, B and E, have greater initial film width, greater width at NDR, and less necking than the intermediate films A and D.

TABLE 4

Necking at NDR

| Product | Initial Film Width (mm) | Width at NDR (mm) | Neck-in, mm | Neck-in, [%] |
|---|---|---|---|---|
| A | 455 | 389 | 66 | 14.5 |
| B | 488 | 454 | 34 | 7.0 |
| D | 456 | 421 | 35 | 7.7 |
| E | 488 | 472 | 16 | 3.3 |

The results in Table 5 below indicate that the films of the invention can achieve similar aeration with less weight compared to the equivalent "intermediate" films. Accordingly, films of the invention result in a significant reduction in film usage.

TABLE 5

Aeration % at NDR

| Product | Aeration % | Weight of film, g/m² | Aeration %/weight of film, (m²/g) |
|---|---|---|---|
| A | 45% | 15.3 | 2.94 |
| B | 59% | 11.8 | 5.03 |
| D | 50% | 18.9 | 2.62 |
| E | 62% | 14.0 | 4.40 |

Table 6 below contains data taken during the application on the pallet at 200% pre-stretching. Necking is also measured on the pallet. The results are compared with J1 and J2 products (ethylene based perforated stretch films) which are similar to those shown in FIG. 6B; they do not comprise reinforcing elements and the "spacers" are not TD prestretched. The weight and the thickness of J1 are 16.2 g/m² and 25 μm, and of J2 are 25.1 g/m² and 38 μm respectively.

As with products A to F from Table 1, products J1 and J2 differ only according to their production process. The base of the film J1 is more prestretched along the machine direction than the base of the film J2, therefore the film weight and base thickness of J1 are lower than for J2.

Products to be wrapped typically sit on a pallet with a wooden base. The effective coverage of the wooden base with the stretch film is very important since the coverage increases the stability during transportation. Table 6 shows that the films according to the present invention, B and E, experience the least necking of the pallet and provide the highest pallet coverage (%).

TABLE 6

Pallet necking & coverage at 200%

| Product | Initial Film Width, mm | Width on the pallet corner, mm | Neck-in @ pallet, mm | Neck-in % @ pallet, % | Wooden Pallet width, mm | Wooden Pallet Coverage, mm | Wooden Pallet Coverage, % |
|---|---|---|---|---|---|---|---|
| A | 455 | 382 | 73 | 16.0 | 14 | 3.9 | 27.9 |
| B | 488 | 432 | 56 | 11.5 | 14 | 7 | 50.0 |
| D | 456 | 381 | 75 | 16.4 | 14 | 4 | 28.6 |
| E | 488 | 428 | 60 | 12.3 | 14 | 6 | 42.9 |
| J1 (comparative) | 500 | 396 | 104 | 20.8 | 14 | 4 | 28.6 |
| J2 (comparative) | 495 | 408 | 87 | 17.6 | 14 | 5 | 35.7 |

Example 2: Tensile Tests

Figure 6B:
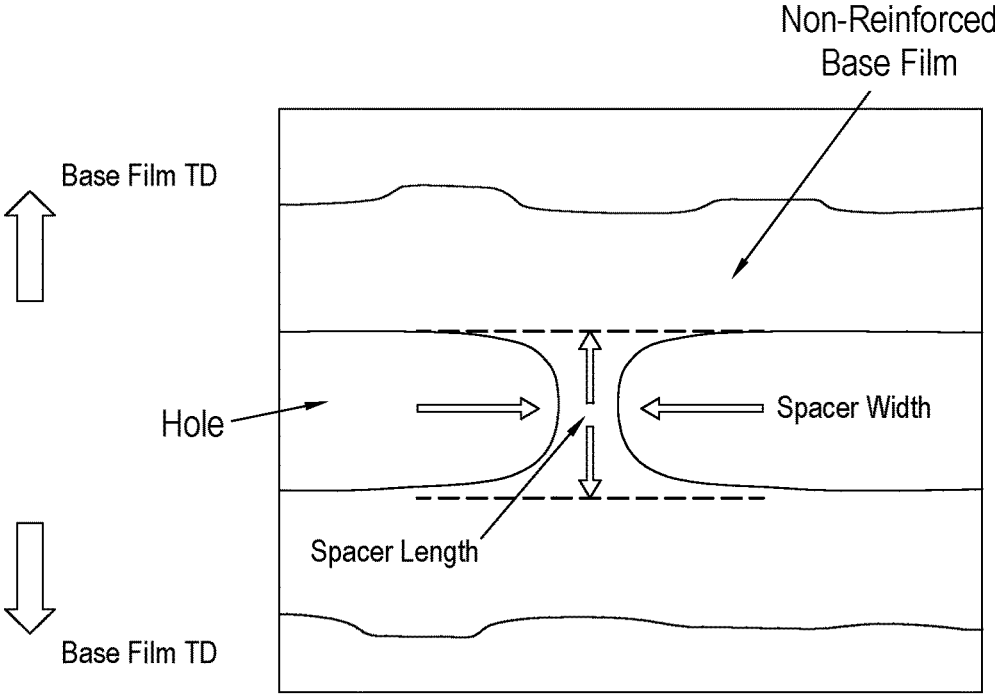
FIG. 6B is an expanded view of a sample of an "intermediate" perforated non-reinforced film.
Figure 7B:
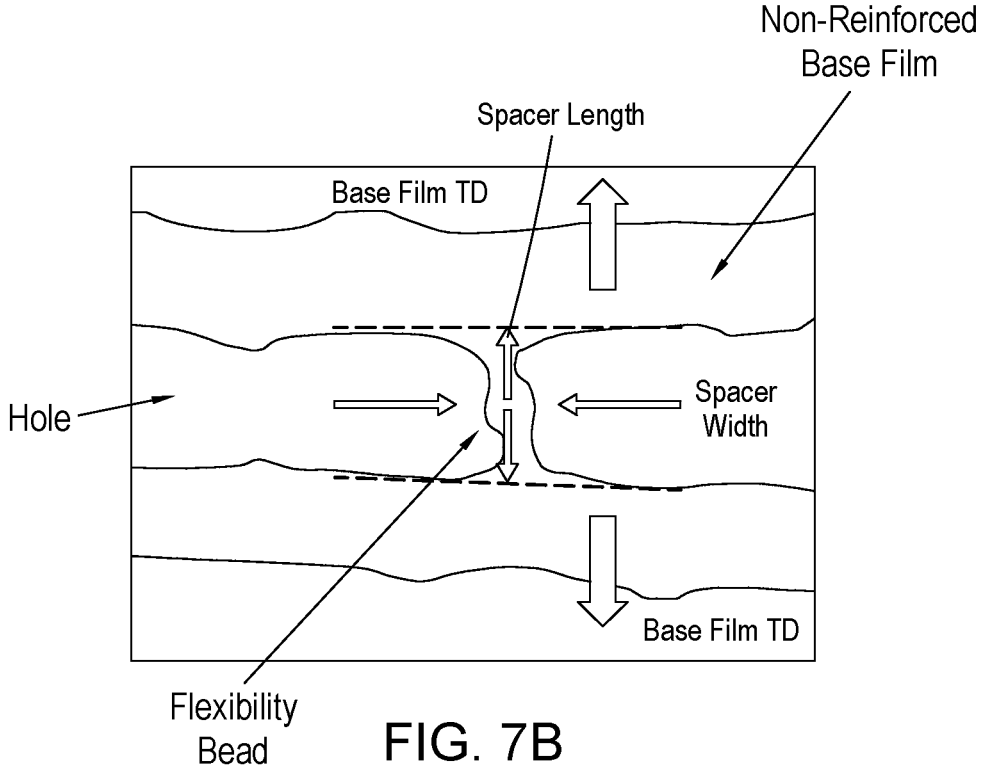

A. The mechanical properties of individual spacers and individual non-perforated columns of "intermediate" perforated reinforced film (as shown in FIG. 6A), were compared to a film according to the invention (FIG. 7A). Corresponding tests were carried out with non-reinforced films (FIGS. 6B and 7B). A film reference was also tested (corresponding to Product 11, 12 and 13 from FIGS. 9A and 16). These comparative films were produced following the prior art methodology, wherein the non-perforated columns were folded and a narrow reinforcing element attached above each folded non-perforated column. Properties were determined using an Instron (Model 3365) tensile testing machine, and a load cell of 100N at room temperature and a constant testing rate of 500 mm/min, in accordance with ASTM D822-97. The ambient temperature when carrying out the experiments was 23° C. and the humidity was 50%.

For the individual spacers the grip-to-grip distance between the clamps is the length of the spacers and the width is the width of the spacers, both measured in millimetres (mm). For example the "intermediate" perforated reinforced and non-reinforced films, the average grip-to-grip distance was 9.4 mm and the width was 4.7 mm. For the film according to the invention the average grip-to-grip distance was 15.0 mm and the width was 2.6 mm.

For the non-perforated columns, the grip-to-grip distance between the clamps for all examples was 50.0 mm.

The results presented in FIGS. 8 and 9 show that only the TD elongation at break is affected by the selective TD prestretching of the spacers. The elongation at break for the spacer of the "intermediate" perforated reinforced film A is 900% while the elongation at break for the spacer of the film according to the invention is 380%, approximately ~58% lower (see FIG. 8). On the contrary, the MD force at break remains unaffected and has the same value, approximately 300 gf. We can conclude that the film according to the invention becomes stiffer due to the selective TD stretching of the spacers.

Figure 9A:
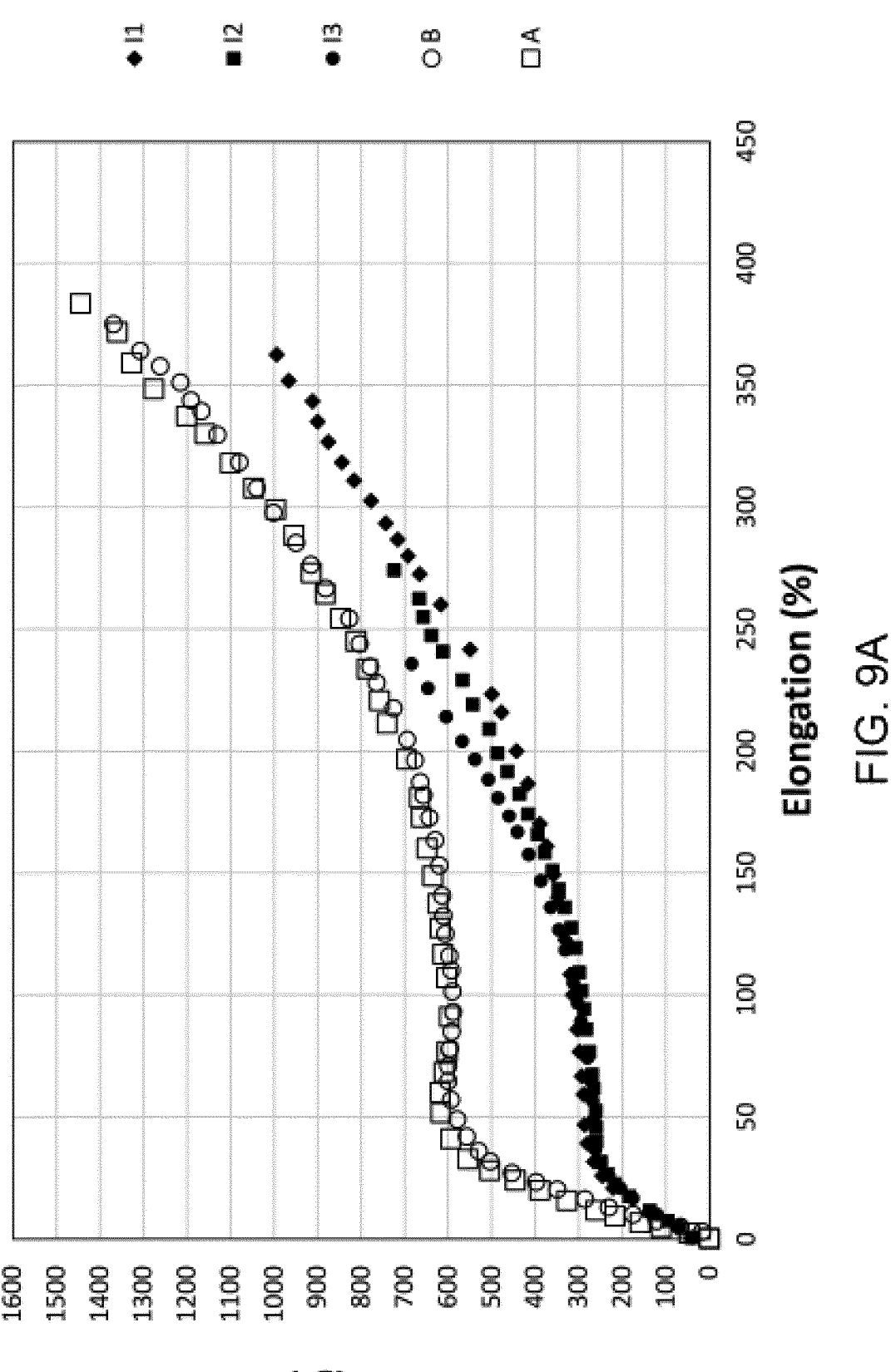
FIGS. 9A and 9B show the force-elongation curves of the non-perforated column for: A: An intermediate commercial reference reinforced perforated film; B: A reinforced film according to the invention; G: An intermediate reference non-reinforced perforated film; H: A non-reinforced film according to the invention; I: A film reference according to the prior art, wherein 11, 12, and 13 are three repeats of the same film.

FIG. 9A shows that stiffness and elongation at break are not affected by the selective TD prestretching of the spacers. The force and elongation at break for the spacers of the "intermediate" perforated reinforced film and for the reinforced film according to the invention are approximately 1400 gf and 370%, respectively, while the comparative films (11, 12 and 13), show a non-stable and a non-predictable behaviour. This may be due to the folding of the base film and the less secure attachment between the reinforcing elements and the threads.

Figure 9B:
Figure 9B:

FIG. 9B shows that the spacer of the non-reinforced "intermediate" perforated film (G) and the spacer of the non-reinforced film according to the invention (H) exhibit similar behaviour due to the absence of the reinforcing element (which may affect the stiffness and the elongation of the films). The weight, the initial width and the thickness of film G are 8.1 g/m², 423 mm and 9.5 μm and of film H are 7.0 g/m², 472 mm and 9.5 μm, respectively.

B. The MD and TD mechanical properties of "intermediate" perforated reinforced films (Product A/D, FIG. 6A), of film according to the invention (Product B/E, FIG. 7A) and of the non-reinforced film of comparison (Product J1/J2, FIG. 6B) were measured using a Zwick-Roell tensile testing machine (Z005, Zwick-Roell, Ulm, Germany), provided with a 5 kN load cell at room temperature and humidity 50%. A constant testing rate of 3000 mm/min was used, using clamps 210 mm wide and the pressure of the pneumatic system that closes the clamps was 8 bars.

For the MD and TD specimens of the "intermediate" perforated reinforced film, the grip-to-grip distance between the clamps was 100 mm and the width of each specimen was 160 mm.

For the MD and TD specimens of the films according to the invention (Product B/E, FIG. 7A) and of those of non-reinforced comparison films, the width and the grip-to-grip distance depend on the perforated pattern. The width of the tested specimens was equal to or more than 160 mm but not wider that the width of the clamps, 210 mm and the grip-to-grip distance was equal or more than 100 mm, but not longer than 125 mm.

For comparison reasons the force normalization (Force/weight of specimen, kgf/g) is needed to remove the weight factor since not all specimens have the same weight.

Example 3: Aeration %

The aeration percentage is defined as the ratio between the area occupied by the holes with respect to the total area of the film (including holes) when the film is stretched to its NDR point. The aeration percentage is calculated for an adequate length over which a good estimate of the overall aeration percentage can be obtained. A typical length is e. g. 1.0 meter. The calculation of aeration was then performed through image analysis.

Example 4: Flexibility Bead

Tensile tests were performed to investigate the benefit of using a flexibility bead:

A: A single spacer of intermediate film A (FIG. 6A) was pre-stretched until NDR point (~170%) using an Instron (Model 3365) tensile testing machine, and a load cell of 100N at room temperature and a constant testing rate of 500 mm/min, in accordance with ASTM D822-97. The ambient temperature when carrying out the experiments was 23° C. and the humidity was 50%. Part of the reinforcing element was included in the grip-to-grip distance. The initial length was 17 mm. When the NDR point was reached, the test was paused, the displacement and force settings were zero and then the test was continued with the same parameters until the specimen's failure. The new initial length was 54 mm.

B: For film B according to the invention, all the spacers were selectively TD prestretched at NDR point, ~160%-170%. A single spacer of film B (FIG. 7A) was tested using an Instron (Model 3365) tensile testing machine, and a load cell of 100N at room temperature and a constant testing rate of 500 mm/min, in accordance with ASTM D822-97. The ambient temperature when carrying out the experiments was 23° C. and the humidity was 50%. Part of the reinforcing element was included in the grip-to-grip distance. The initial length was 17.5 mm.

Figure 15:
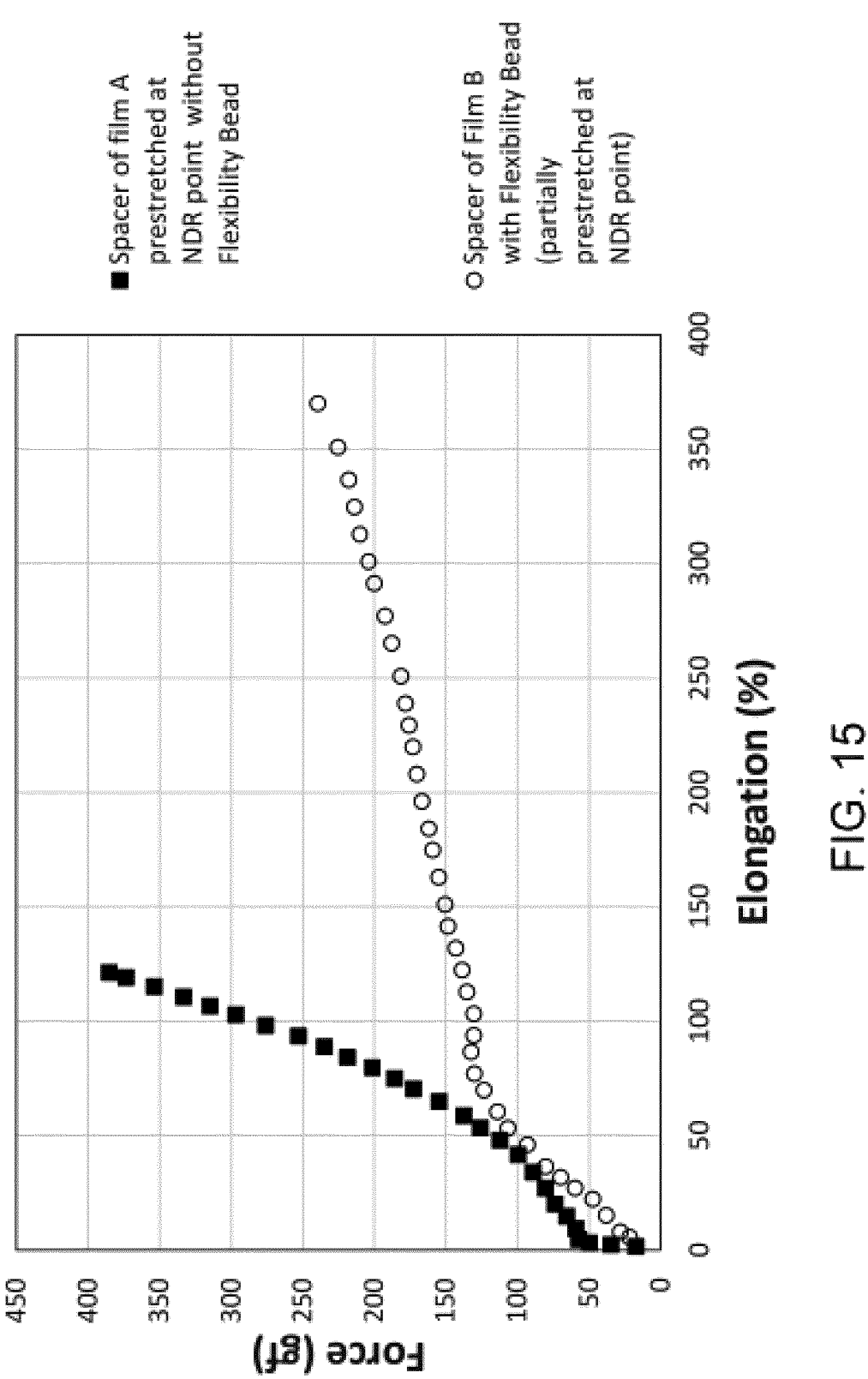
FIG. 15 shows force-elongation curves showing the effect of using flexibility bead (the squares show film A with spacers prestretched to the NDR point, without flexibility bead; the round circles show film B with spacers selectively TD prestretched to the NDR point, with a flexibility bead).

FIG. 15 illustrates the results.

Due to the presence of the bead, a pseudo-plastic zone is present (100-250% elongation) in the films according to the invention, which gives an extra elasticity and softness, thus the film is more forgiving to the effect of the applied forces (tearing, etc.)

Example 5: Mass Transfer

Tensile tests were performed to investigate the mass transfer from the non-perforated area to the spacer:

A: For a film H (non-reinforced film according to the invention) specimens comprising multiple-spacers were tested using an Instron (Model 3365) tensile testing machine, and a load cell of 100N at room temperature and a constant testing rate of 500 mm/min, in accordance with ASTM D822-97. The ambient temperature when carrying out the experiments was 23° C. and the humidity was 50%. The initial length was 26 mm.

B: For a film B (reinforced film according to the invention) specimens comprising multiple-spacers were tested using an Instron (Model 3365) tensile testing machine, and a load cell of 100N at room temperature and a constant testing rate of 500 mm/min, in accordance with ASTM D822-97. The ambient temperature when carrying out the experiments was 23° C. and the humidity was 50%. The initial length was 25 mm.

C: For a film I according to the prior art (see methodology in Example 2, films 11, 12 and 13), several specimens comprising multi-spacers were tested using an Instron (Model 3365) tensile testing machine, and a load cell of 100N at room temperature and a constant testing rate of 500 mm/min, in accordance with ASTM D822-97. The ambient temperature when carrying out the experiments was 23° C. and the humidity was 50%. The initial length was 30 mm.

Figure 16:
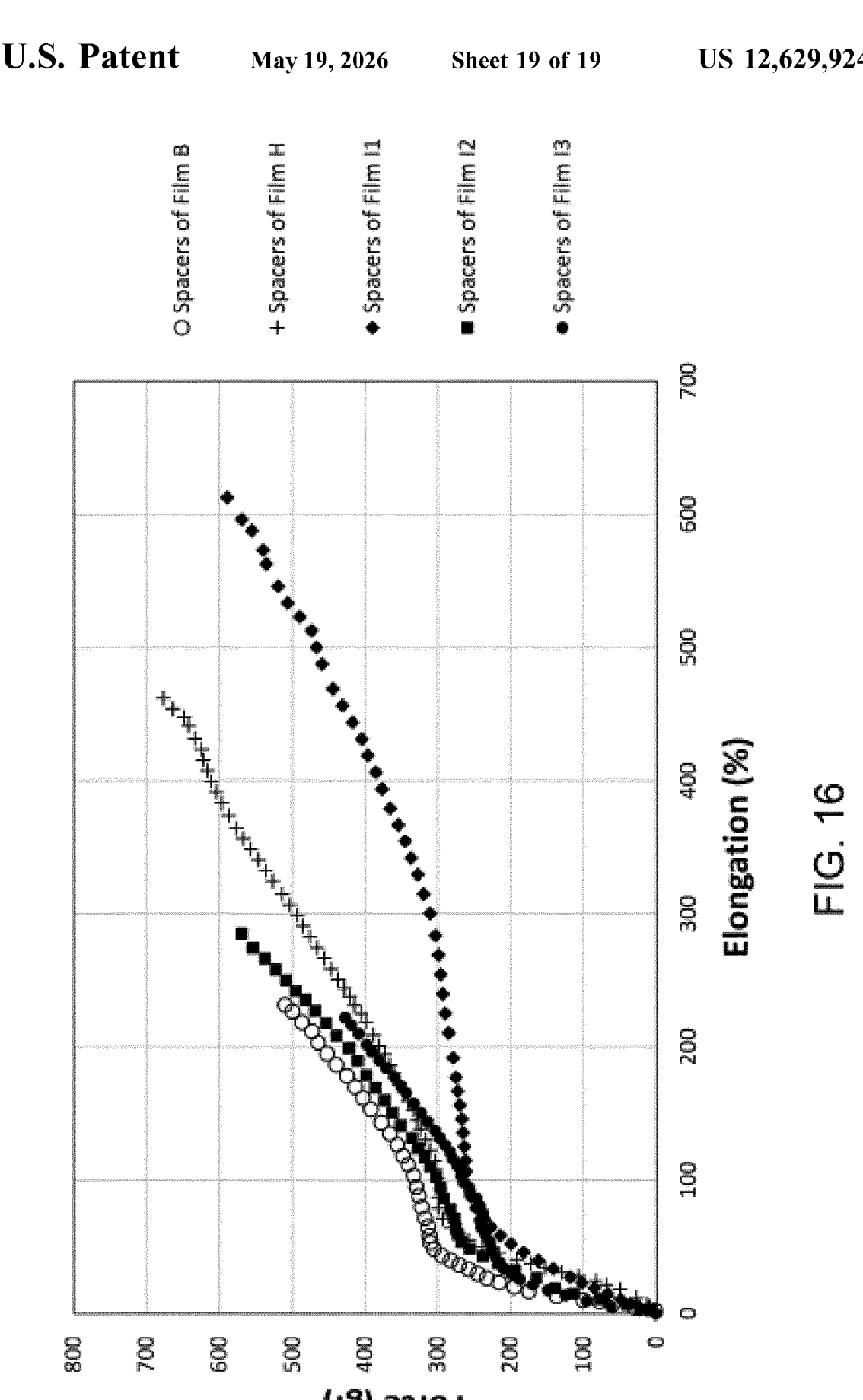
FIG. 16 shows force-elongation curves of multi-spacers measured in a tensile test for B: A reinforced film according to the invention; H: A non-reinforced film according to the invention; I: A film reference according to the prior art, wherein 11, 12, and 13 are three repeats of the same film.

The results are illustrated in FIG. 16.

Due to the reinforcing element, the spacer (B curve) shows higher force (stiffness) and lower elongation. Less mass can be transferred from the non-perforated area to the spacer during TD stretching.

On the contrary, the non-reinforced results show lower force (stiffness) and higher elongation. Due to the absence of the reinforcing element, mass can be transferred from the non-perforated area to the spacer during TD stretching.

Finally, the film according to the prior art shows unpredictable and unstable behaviour due to its production process (for instance, folding of the non-perforated area, attachment of the reinforcing element to the folded non-perforated column, etc). The folded aspect of these films adds uncertainties to the final characteristics. For example, there may be wrinkles in the fold, which can trap air when a reinforcing element is placed on top. Alternatively, the folded base can unfold during the stretching process. Furthermore, when the reinforcing element is on a folded base, in some circumstances, the reinforcing element may be attached to the base and mass cannot be withdrawn during stretching. In other cases the reinforcing element may prevent attachment to the base, allowing the spacer to absorb mass during stretching, further highlighting the inconsistent and unstable behaviour of these films.

The invention claimed is:

1. A thermoplastic stretch film comprising
a base film arranged in a plurality of columns, and
a multiplicity of holes in the base film arranged in a plurality of columns,
wherein the plurality of columns of the base film and the plurality of columns of holes extend along a longitudinal direction of the base film;
wherein each column of holes comprises a plurality of holes, wherein each hole is separated from its adjacent hole within each individual column by a spacer, wherein each spacer comprises a strip of film which has been selectively prestretched in a transverse direction of the film to a value up to its elongation at break;
wherein each column of holes is separated from each adjacent column of holes by one or more columns of base film.

2. The thermoplastic film according to claim 1, wherein the base film is of substantially uniform thickness.

3. The thermoplastic film according to claim 1 wherein the spacer strips are transversally oriented across the film.

4. The thermoplastic film according to claim 1, wherein the weight per square metre of the film is less than 100 g/m².

5. The thermoplastic film according to claim 1, wherein the film has a width of more than 250 mm.

6. The thermoplastic film according to claim 1, wherein a width of the film is from 400 to 1300 mm.

7. The thermoplastic film according to claim 1, wherein a thickness of the base film is from 4 to 40 μm.

8. The thermoplastic film according to claim 1, wherein each spacer has been prestretched to at least 100% elongation, in the transverse direction of the film.

9. The thermoplastic film according to claim 1, wherein a length of each spacer is equivalent to at least from 10% up to 500% of a width of its adjacent column of the base film.

10. The thermoplastic film according to claim 1, wherein a length of each spacer is equivalent to no more than 300% of a width of its adjacent column of base film.

11. The thermoplastic film according to claim 1, wherein a width of each spacer at the point where it is joined to its adjacent columns of the base film is from 2 to 50 mm.

12. The thermoplastic film according to claim 1, wherein an elongation of each spacer is up to 80% of the elongation at break.

13. The thermoplastic film according to claim 1, wherein the holes of a column are misaligned in the transverse direction with respect to the holes in an adjacent column of holes.

14. The thermoplastic film according to claim 13, wherein the misalignment is selected such that the ends of the spacer strips align transversally with a midpoint of a side of the hole in the adjacent column of holes.

15. The thermoplastic film according to claim 1, wherein the spacer strips in a column of holes align transversally to a machine direction (MD with the spacer strips in every other column of holes, forming a continuous row across the width film.

16. The thermoplastic film according to claim 15, wherein the spacer strips form continuous straight rows across the transverse direction of the film.

17. The thermoplastic film according to claim 16, where the holes of a column are aligned at the transverse direction with the holes of an adjacent column of holes.

18. The thermoplastic film according to claim 1, wherein the plurality of columns of holes occupy up to 80% of the total surface area of the film.

19. The thermoplastic film according to claim 1, wherein at least one surface of the film comprises a cling surface.

20. The thermoplastic film according to claim 1, wherein each spacer comprises a flexibility bead, said flexibility bead comprising a reservoir of additional stretchable base film material capable of being stretched in use.

21. The thermoplastic film according to claim 1, comprising one or more reinforcing elements affixed to the base film between adjacent columns of holes.

22. The thermoplastic film according to claim 21, wherein the reinforcing elements affixed to the base film are folded.

23. The thermoplastic film according to claim 21, wherein the reinforcing elements affixed to the base film are not folded and are free of wrinkles.

24. A process for producing a thermoplastic stretch film according to claim 1, comprising:
providing an initial extruded plastic stretch film;
perforating the initial plastic stretch film to form an intermediate plastic film comprising columns of holes in a longitudinal direction, wherein each hole is separated from an adjacent hole in the longitudinal direction by a spacer;
and selectively prestretching each spacer in the transverse direction of the film.

25. The thermoplastic film according to claim 1, wherein the weight per square metre of the film is less than 60 g/m².

26. The thermoplastic film according to claim 1, wherein the weight per square metre of the film is less than 45 g/m².

27. The thermoplastic film according to claim 1, wherein the weight per square metre of the film is less than 28 g/m².

28. The thermoplastic film according to claim 1, which has a width of more than 350 mm.

29. The thermoplastic film according to claim 1, which has a width of more than 400 mm.

30. The thermoplastic film according to claim 1, wherein a width of the film is from 450 to 600 mm.

31. The thermoplastic film according to claim 1, wherein a width of the film is about 490 mm.

32. The thermoplastic film according to claim 1, wherein a thickness of the base film is from 10 to 16 μm.

33. The thermoplastic film according to claim 1, wherein a thickness of the base film is about 12 μm.

34. The thermoplastic film according to claim 1, wherein each spacer has been prestretched to at least 200% elongation in the transverse direction of the film.

35. The thermoplastic film according to claim 1, wherein each spacer has been prestretched to at least 300% elongation in the transverse direction of the film.

36. The thermoplastic film according to claim 1, wherein a width of each spacer at the point where it is joined to its adjacent columns of base film is from 5 to 30 mm.

37. The thermoplastic film according to claim 1, wherein the elongation of each spacer is up to 90% of the elongation at break.

38. The thermoplastic film according to claim 1, wherein the elongation of each spacer is up 95% of the elongation at break.

\* \* \* \* \*